US008647039B2

(12) United States Patent
Helmner

(10) Patent No.: US 8,647,039 B2
(45) Date of Patent: *Feb. 11, 2014

(54) SYSTEM FOR LOADING AND UNLOADING LOOSE CARGO IN A CARGO HOLD, PREFERABLY OF A PLANE, AND INTERMEDIATE CONVEYOR MEANS OR CONVEYOR UNIT HEREFOR

(75) Inventor: Anders Helmner, Bjarred (SE)

(73) Assignee: Telair International AB (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/536,413

(22) Filed: Jun. 28, 2012

(65) Prior Publication Data

US 2012/0325969 A1 Dec. 27, 2012

Related U.S. Application Data

(62) Division of application No. 10/510,293, filed as application No. PCT/EP03/02494 on Mar. 11, 2003, now Pat. No. 8,562,276.

(30) Foreign Application Priority Data

Mar. 11, 2002 (DE) .................................. 102 10 575
Mar. 11, 2002 (DE) .............................. 202 12 383 U
Aug. 21, 2002 (DE) .................................. 102 38 249

(51) Int. Cl.
*B64F 1/32* (2006.01)

(52) U.S. Cl.
USPC ......................... 414/345; 244/137.1; 198/588

(58) Field of Classification Search
USPC ........ 414/345–347, 373; 244/137.1; 198/584, 198/812, 588
See application file for complete search history.

(56) References Cited

U.S. PATENT DOCUMENTS

| 2,648,422 | A | 8/1953 | Kling |
| 3,356,236 | A | 12/1967 | Shaw et al. |
| 3,543,917 | A | 12/1970 | Duerksen |
| 3,651,963 | A | 3/1972 | McWilliams |
| 3,741,504 | A | 6/1973 | Alberti et al. |
| 3,799,479 | A | 3/1974 | Roeder et al. |
| 3,885,682 | A | 5/1975 | McWilliams |
| 4,050,655 | A | 9/1977 | Bogue |

(Continued)

FOREIGN PATENT DOCUMENTS

| DE | 3014782 A1 | 5/1982 |
| DE | 4032772 C1 | 11/1991 |

(Continued)

*Primary Examiner* — Joshua Rudawitz
(74) *Attorney, Agent, or Firm* — Barnes & Thornburg LLP

(57) ABSTRACT

The present invention concerns a system for loading and unloading loose cargo, such as preferably pieces of luggage or the like, in a cargo hold of a plane, including conveying the loose cargo towards the inner end of the cargo hold during loading, or away from it during unloading, and including transport of the loose cargo between the level of the tarmac and the cargo hold opening. The loose cargo may during loading be conveyed into the fuselage in a direction transversal to the longitudinal axis of the plane and also in the longitudinal direction of the plane, and deposited, in the cargo hold. Loose cargo conveyed back into the plane of the cargo hold opening during unloading may be conveyed off transversely to the longitudinal axis of the plane through the cargo hold opening. Moreover the invention proposes intermediate conveyor means herefor.

41 Claims, 23 Drawing Sheets

(56) References Cited

U.S. PATENT DOCUMENTS

| | | | |
|---|---|---|---|
| 4,218,034 A | 8/1980 | Magill | |
| 4,544,319 A | 10/1985 | Folling | |
| 4,635,883 A | 1/1987 | Hamilton et al. | |
| 4,780,043 A | 10/1988 | Fenner et al. | |
| 4,860,973 A | 8/1989 | Fenner | |
| 5,000,646 A | 3/1991 | Pietropaoli | |
| 5,538,391 A | 7/1996 | Bonnet | |
| 6,006,893 A | 12/1999 | Gilmore et al. | |
| 6,431,346 B1 | 8/2002 | Gilmore et al. | |
| 6,823,985 B2 | 11/2004 | Gilmore et al. | |
| 6,893,200 B2 | 5/2005 | Thogersen | |
| 7,033,125 B2 | 4/2006 | Thogersen | |
| 7,077,615 B2 * | 7/2006 | Thogersen et al. | 414/346 |
| 7,156,604 B2 | 1/2007 | Thogersen | |
| 7,469,782 B2 | 12/2008 | Hutton | |
| 7,470,099 B2 * | 12/2008 | Bengtsson | 414/346 |
| 7,784,597 B2 * | 8/2010 | Frankl et al. | 198/313 |

FOREIGN PATENT DOCUMENTS

| | | |
|---|---|---|
| DE | 69002122 T2 | 10/1993 |
| DE | 4238095 A | 5/1994 |
| DE | 4238095 A1 | 5/1994 |
| DE | 29721959 U1 | 2/1998 |
| DE | 19719567 A1 | 11/1998 |
| DE | 19719748 A1 | 11/1998 |
| DE | 19728347 A1 | 1/1999 |
| DE | 19961349 A1 | 6/2001 |
| DE | 10007332 A1 | 1/2002 |
| DE | 10007332 A1 | 10/2002 |
| EP | 0263540 A | 4/1988 |
| EP | 0263540 A1 | 4/1988 |
| GB | 1146895 A | 3/1969 |
| GB | 2154968 A1 | 9/1985 |
| WO | 8902852 A1 | 6/1989 |
| WO | 9854073 | 12/1998 |
| WO | 01/44049 A1 | 6/2001 |
| WO | 0149595 A1 | 7/2001 |
| WO | 0151356 | 7/2001 |

* cited by examiner

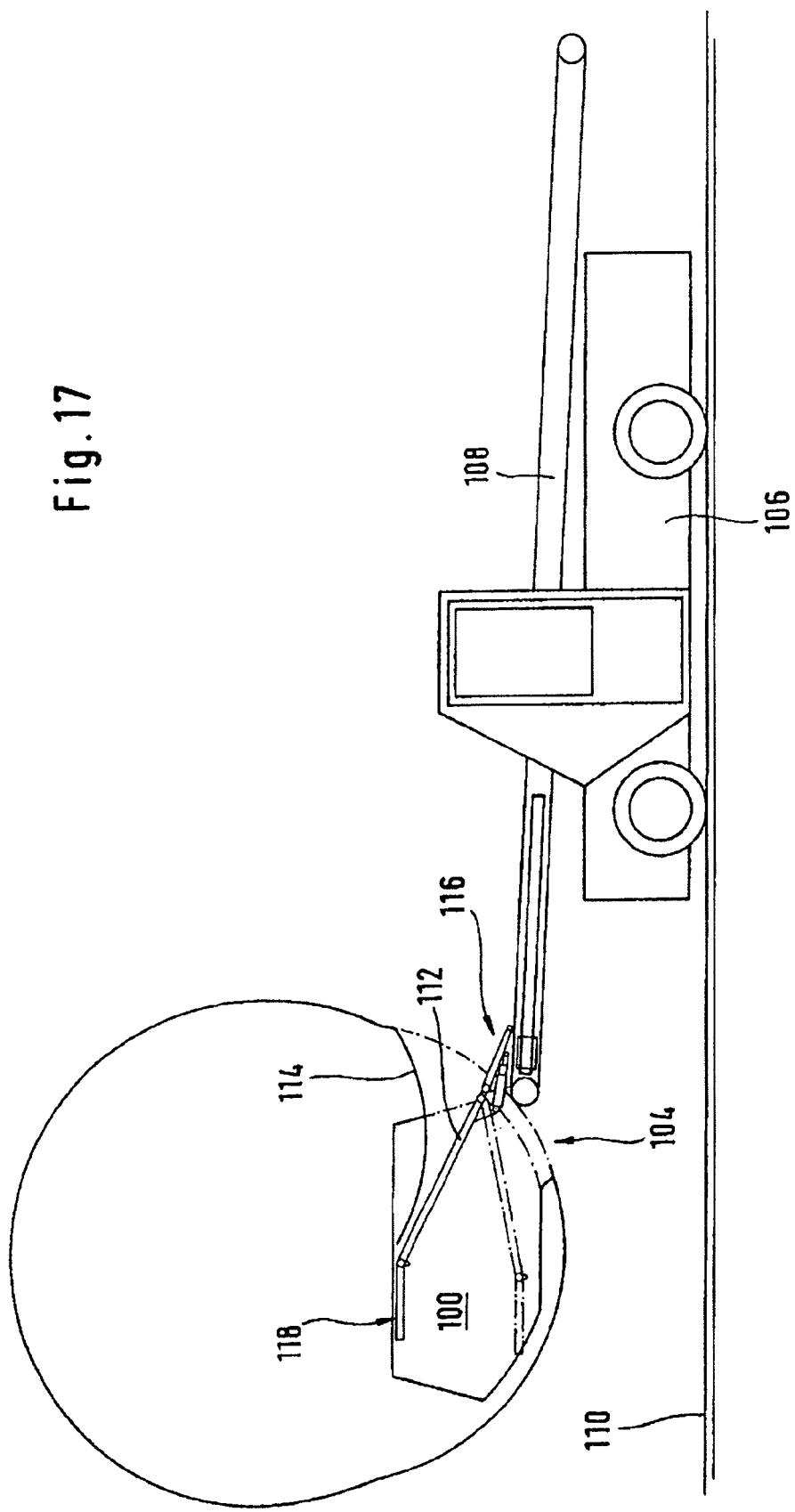

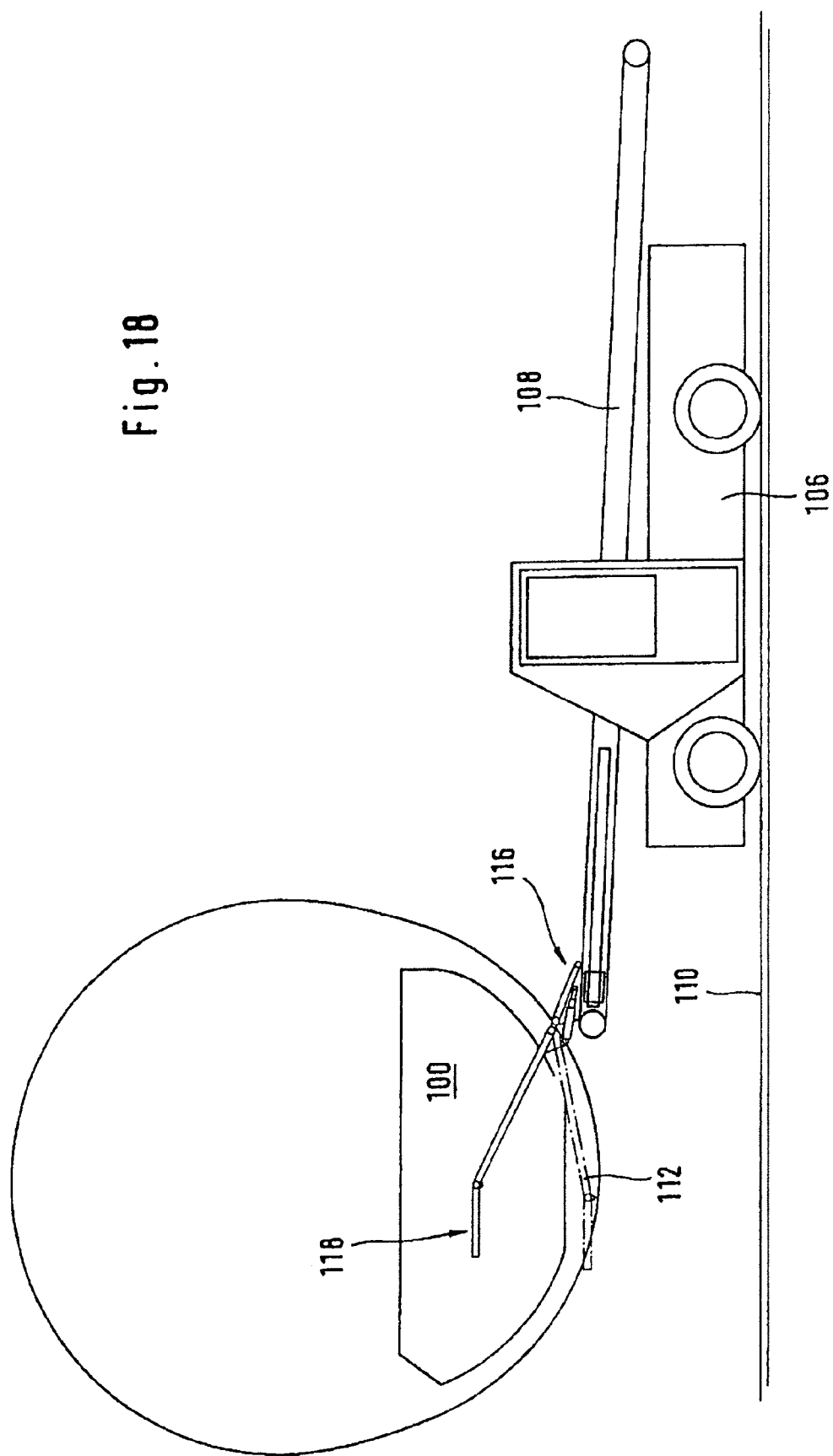

SYSTEM FOR LOADING AND UNLOADING LOOSE CARGO IN A CARGO HOLD, PREFERABLY OF A PLANE, AND INTERMEDIATE CONVEYOR MEANS OR CONVEYOR UNIT HEREFOR

RELATED APPLICATIONS

This application is a division of application Ser. No. 10/510,293, filed Oct. 6, 2004 now U.S. Pat. No. 8,562,276, which is a U.S. nationalization under 35 USC §371 of International Application No. PCT/EP03/02494 filed Mar. 11, 2003.

The present invention concerns a system for loading and unloading loose cargo in a cargo hold, preferably of a plane, and intermediate conveyor means herefor as well as a conveyor unit herefor.

BACKGROUND

When loose cargo, i.e., single-item cargo, is loaded and unloaded in cargo holds, it generally must at first be taken from the surroundings to the cargo hold opening and through the latter, free space must be identified in the cargo hold, and the loose cargo must be deposited or stacked, or stowed away there. Loading and unloading loose cargo in a cargo hold of a plane involves a particular difficulty inasmuch as the loose cargo must initially—in a view restricted to the closer surroundings of the plane—be taken up from the tarmac to the cargo hold opening inside the fuselage, be received there while avoiding any damage to the fuselage or to the structure representing it, and then taken to a free space in the cargo hold of the plane and optionally be stacked or stowed away as compact as possible. Here the frequently narrow space conditions are an additional complication, as for example at a cargo hold depth of 8 m or more and a cargo hold height of no more than about 1.15 m in a Boeing 737, personnel charged with loading and unloading the plane can only work in a bent, kneeling, or squatting position. The distance from the cargo hold opening to the rear end of the cargo hold must be covered by sliding on the knees. For stowing away or stacking the loose cargo, the personnel must frequently pick it up while turning backwards over the shoulder, heave it up, and deposit it in a forward direction. Damages or injury to the muscles, sinews or ligaments and also to the musculoskeletal support system can easily happen in the process. As a further present-day complication, at least 5 tons of loose cargo have to be loaded or unloaded within less than 10 minutes for reasons of economy. The personnel working inside the fuselage in the cargo hold moreover has to take care to neither damage the loose cargo nor harm the structure of the cargo hold. This has the result that the movements already highly straining to the musculoskeletal support system of the personnel in question will be performed quickly and heedlessly so as to further raise the risk of injury to personnel.

In order to take loose cargo from the tarmac to the cargo hold opening, or into the adjacent range inside the plane immediately behind the cargo hold opening, from where it may then be stowed away in the cargo hold by the personnel, fundamentally the following approaches are known, for example:

DE 199 61 349 A1 describes a mobile apparatus for loading and unloading planes, comprising a chassis and a conveyor device located on the chassis such as, e.g., a conveyor belt. In order to be able to transport different types of loads, for example loose cargo, from the tarmac or from a transport plane arriving at the plane on the tarmac into the plane by using this mobile apparatus, it is proposed in DE 199 61 349 A1 that this mobile apparatus has a principal conveyor, whose height and inclination in the direction of transport can be adjusted in relation to the chassis, and has at least one transfer conveyor at one longitudinal end of the principal conveyor, that is adapted to pivot about a horizontal transverse axis in relation to the latter. By means of such a mobile apparatus, loose cargo may be taken up from the tarmac to the cargo hold opening of the plane and handed over through the latter into the plane.

As such mobile transport equipment is not available at every airport, however, it has been proposed in DE 297 21 959 U1 to carry such apparatus on the plane. The luggage loading device for planes as described in DE 297 21 959 U1, which comprises a belt conveyor, is mounted on an air freight pallet and stowed away inside the fuselage. During operation, the belt conveyor is extended out through the loading opening of the plane, tilted down to the tarmac, adjusted to the required length, and then propped on the tarmac by its lower end, so that loose cargo may be conveyed up from the tarmac to the cargo hold opening, or out of the latter and down.

WO 98/54073 describes a conveyor organ, the front portion of which may be introduced through a cargo hold opening into the cargo hold of a plane, moved across the cargo hold floor by means of casters, which conveyor organ is to provide a conveyor belt leading from the tarmac to the rear end of the cargo hold as a support for the loading and unloading operation that is in this case also performed manually by a person. In order to operate the conveyor organ, it is advanced towards the plane on the tarmac, a first portion thereof is raised to the height of the cargo hold opening in the manner of an inclined plane, another portion is introduced into the cargo hold opening, bent there by 90 degrees, and then another portion is extended in parallel with the inside wall in the cargo hold from the cargo hold opening to the rear end of the cargo hold. An additional table, which is erected on the floor at the rear end, is to extend across the entire width of the cargo hold and is adjustable in height. Suitcases, sacks or the like goods may thus be loaded and unloaded, with loading being performed by transporting these goods with the aid of the conveyor belt from the tarmac to the end of the conveyor belt in the cargo hold in front of the table, from where they are dragged onto the table by the person kneeling at the table, and dragged on across the latter to then push them onto the stack of loose cargo to be formed. The apparatus described in WO 98/540734 has the drawback that when either one of the table and conveyor organ is handled inappropriately, harm or damage to the structure of the plane must inevitably be feared. If the table is adjusted in height with loose cargo placed on it, there is a risk of the inside wall being damaged immediately by its ends adjacent thereto. During introduction of the extremely long and unwieldy conveyor belt, damage to the cargo hold opening cannot be ruled out. Moreover this auxiliary apparatus is of little help, for whenever a row of loose cargo has been stacked, it must be moved back for a distance, positioned anew, and connected with the table which equally has to be oriented anew.

In DE 100 07 332 A1, an alternative embodiment of a base vehicle is discussed that is capable of travelling on the tarmac and comprises an endless conveyor belt reaching into the cargo hold. DE 100 07 332 A1 proposes reversible conveyor means for cargo items, including a outrigger that is pivotable and adjustable in height and length, for loading and unloading luggage items in passenger planes. Transition stations are to be avoided. Handling of the pieces of luggage, or stowing and removing them in the cargo hold is here again performed manually by persons working on site.

In order to facilitate the work of the personnel in the cargo hold, a loading device for a cargo hold of a plane has been proposed by the present applicant, e.g., in DE 42 38 095 A1. This cargo hold loading device, well-tried under rough everyday conditions during loading and unloading of planes, is successfully advertised by the applicant, i.a. by the prospectus "The Sliding Carpet Loading System". This transport means, which covers the surface of the floor in the cargo hold, serves in particular for intermittently conveying the loose cargo towards the inside of the cargo hold and its rear end during loading, and away from it during unloading, with the front end of the transport means reaching into the range of the cargo hold opening inside the fuselage, and having the form of a transport carpet in a particularly successful embodiment.

These apparatus or transport means do help to facilitate or reduce the use of human labor in the cargo hold, however they still require the use of human labor, particularly in the range the cargo hold hatch. As before, personnel must receive the luggage or loose cargo, conveyed by the external conveyor organ from the tarmac up to the cargo hold opening, while in an extremely uncomfortable working position, and deposit it in the cargo hold across the width of the fuselage on the front end of the transport means having the form of a transport carpet, for instance, and thereby successively convey it into the inside of the cargo hold. Accordingly, for unloading it is in turn necessary to use personnel who successively fetch the loose cargo by means of the transport means in the cargo hold into the range of the cargo hold opening, takes up the loose cargo, carries it in an uncomfortable position, whether bent or squatting, to the end of the external conveyor device projecting into the cargo hold opening, delivers it there, and then conveys it down to the tarmac with the aid of the external conveyor device.

SUMMARY

Moreover the personnel charged with these works frequently receives poor payment, is inadequately trained, and thus only insufficiently motivated. Accordingly, inadvertent damage to the structure of the plane in the cargo hold and particularly in the range of the cargo hold opening often happens, although this expressly is to be avoided. As a result, immense costs are caused by the necessary repairs and the related down periods of the plane.

Accordingly it is an object of the present invention to avoid at least some of the above drawbacks by proposing a system that combines the known transport means in the cargo hold of the plane with the conveyor organs located externally of the plane into an overall concept, so that during loading, loose cargo may be taken automatically, without the use of personnel in the cargo hold, from the tarmac into the cargo hold and automatically stowed away there, and during unloading may again be transported automatically from the cargo hold back onto the tarmac.

Moreover it is an object of the present invention to specify intermediate conveyor means suitable for this purpose It is furthermore an object of the present invention to propose a system as well as an intermediate conveyor means suited herefor, whereby the known transport means in the cargo hold of the plane may be combined with the conveyor organs external of the plane into an overall concept, so that loose cargo may be taken from the tarmac into the cargo hold and stowed away there during loading, and again be transported from the cargo hold back onto the tarmac during unloading, without the health of the personnel employed being put at risk in the process.

Finally it is an object of the present invention to specify intermediate conveyor means whereby—without known transport means being available in the cargo hold of the plane, and with merely conveyor organs external of the plane and reaching into the cargo hold being available an overall concept may be realized such that loose cargo may be taken from the tarmac into the cargo hold and stowed away there during loading, and again be transported back from the cargo hold to the tarmac during unloading, without the health of the personnel employed being put at risk in the process.

The present invention for the first time proposes a system for loading and unloading loose cargo in a cargo hold, particularly of a plane, comprising transport means covering the area of the cargo hold floor for particularly intermittently conveying the loose cargo towards the inner end of the cargo hold during loading, and away from there during unloading, with the front end of the transport means reaching into the range of the cargo hold opening inside the fuselage, and a conveyor organ connecting to the cargo hold opening on the outside of the plane for transporting the loose cargo between the level of the tarmac and the cargo hold opening, wherein it is provided for the first time that between the plane-side end of the conveyor organ and the front end of the transport means in the cargo hold at least one intermediate conveyor means is arranged, whereby during loading, the loose cargo may initially be conveyed deeper into the fuselage in a direction transversal to the longitudinal axis of the plane, and subsequently be conveyed in the longitudinal direction of the plane and deposited on the front end of the transport means in the cargo hold, and whereby during unloading, loose cargo conveyed beyond the front end of the transport means into the plane of the cargo hold opening may be transported off transversely to the longitudinal axis of the plane up through the cargo hold opening.

Thus it is for the first time advantageously possible to entirely do away with employing human labor in the cargo hold during loading and unloading loose cargo. In this way not only the related personnel costs are saved and thus operating costs are lowered, but at the same time the risk of damage to the structure in the cargo hold is reduced towards zero. By reducing the risk of damage, advantageously at the same time the risk of down times for repairing such damages, and thus the enormously high repair costs, are fundamentally reduced to zero. Furthermore the system of the invention offers the advantage of automatically loading and unloading the cargo hold while guaranteeing the minimum throughput rates demanded by the user, of at least 5 tons within about 10 minutes at any time of day and night, failsafe, even with strikes or similar events. Moreover the system of the invention for the first time allows an optimum utilization of the available cargo hold area and also of the available cargo hold volume in automatic loading and unloading of the cargo hold, for in a preferred embodiment the system of the invention may be realized with suitable sensors, cameras, control circuits and/or artificial intelligence, so that the loose cargo may be deposited and stowed not only automatically, but specifically also in locations in the cargo hold where gaps are still free, for example.

Moreover the system of the invention may advantageously be realized such as to be permanently mounted in the cargo hold of the plane. Here it is advantageously possible to carry out adaptations to marginal conditions differing between the various types of planes, such as, e.g., local availability of loading points provided in the structure for absorbing and dissipating forces, spatial dimensions of the cargo hold, geometrical configuration of the cargo hold, position of the cargo hold opening relative to the cargo hold, etc. With a system of the invention for loading and unloading the cargo hold adapted in such a manner to the local conditions of a particular type of plane, inadvertent harm to the structure of the plane in the range of the cargo hold and particularly in the range of the cargo hold opening is entirely excluded, for because the intermediate conveyor means are mounted in the cargo hold and thus need not taken into the cargo hold through the cargo hold opening during operation, the damages to be feared in that process definitively do not occur.

The system proposed for the first time, and particularly the intermediate conveyor means provided herefor, may be manufactured, e.g., of particularly lightweight materials, such as meanwhile available high-strength aluminum, carbon fiber composite materials, or composites. When using correspondingly rigid profile members of such materials, it is possible to realize a low overall weight of the intermediate conveyor means satisfactory to such a degree that a permanent arrangement of the intermediate conveyor means in the cargo hold of the plane does not have a negative influence under the aspect of the maximum available transport capacity. The like rigid and at the same time extremely lightweight profile members offer not only the advantage of an altogether particularly low weight of the intermediate conveyor means, but at the same time allow to produce intermediate conveyor means that will without any problems stand up to the high strains in everyday operation, such as with a view to the partly high weight of loose cargo to be conveyed thereby, or with a view to the high load maxima at great mass throughput of loose cargo for particularly rapid loading and/or unloading.

In an equally preferred variant of the system of the invention, the intermediate conveyor means may be connected mechanically with the conveyor organ that is adapted for travel on the tarmac. The conveyor organ capable of travelling on the tarmac may then be prolonged by the intermediate conveyor means, substantially rectilinearly, at its end facing the cargo hold opening. This offers the advantage that there is less need to pay attention to weight, and the intermediate means may thus be realized more cost-effectively in regard of materials and yet with a sufficient strength or load-bearing capacity. In the case of this preferred combination, damage to the immediate range around the cargo hold opening cannot be excluded entirely, for the intermediate conveyor means have to be introduced through the cargo hold opening and positioned crosswise to the longitudinal direction of the plane. With a correspondingly skilful manner of operating, however, this damage risk is negligible. Moreover, damage to the cargo hold per se or to the structure whereby it is constituted, may in any case be ruled out.

Thanks to the system of the invention, and particularly the intermediate conveyor means provided therefor, it is possible to shorten the time for loading and unloading of a plane, and thus reduce the operating costs.

With the system of the invention it is thus possible for the cargo items moved during loading and unloading to be purposely deposited on the transport means in the cargo hold during loading, and to be purposely picked up and transported away from there during unloading. This offers the major advantage that the available cargo hold, and particularly free areas there, may be occupied optimally with loading goods, loose cargo, pieces of luggage, etc. In particular with automation by means of corresponding sensors, cameras, control circuits, artificial intelligence or the like, the loading condition of the cargo hold may permanently be monitored, and the system may be adapted correspondingly.

To this end, it is provided in a further preferred embodiment that above the floor of the cargo hold horizontally between the intermediate conveyor means and the floor of the cargo hold in the range of the cargo hold opening, a tray covering the area of the floor of the cargo hold and of the floor-side range of the cargo hold opening is arranged. This tray, particularly collecting tray, at the same time offers the advantage that even when cargo hold openings are extended into the lower range of the fuselage, the full width of the cargo hold may be loaded with loose cargo, without a risk of loose cargo falling down from the end of the external conveyor organ facing the cargo hold opening and between the conveyor organ and the cargo hold opening, in the worst case down on the tarmac, when a sliding off "over the corner" occurs which may never be completely precluded.

In a further preferred embodiment, the tray, particularly collecting tray, which is also referred to as a "Door Way Unit" (in brief: DWU), may be folded over or up along a line parallel to the longitudinal axis of the plane. Thus it is ensured in a further advantageous manner, that following a loading or unloading operation the one portion of this tray or DWU adjacent the cargo hold opening may be folded over, out of the neighboring range of the cargo hold opening, into the inside of the cargo hold towards the middle, so that afterwards the cargo hold opening is cleared completely and may be closed by the cargo hold door.

In accordance with a further preferred embodiment, it is provided that the transport means in the cargo hold is a transport carpet. In addition to the advantage of continuous, discontinuous, or intermittent conveying of the loose cargo into the inside of the cargo hold, this moreover offers a substantial space-saving potential, for such a transport carpet has a particularly low structural height and thus, little stowage capacity of the cargo hold is lost by installing transport means having, e.g., the form of a transport carpet.

In a further preferred embodiment of the system of the invention, the intermediate conveyor means comprise at least one first conveyor organ adapted to be modifiable in length in the conveying direction, preferably a conveyor belt. The latter receives loose cargo from the plane-side end of the external conveyor organ in the range of the cargo hold opening during loading, and conveys it on transversely to the longitudinal axis of the plane, wherein its end inside the fuselage is followed by another conveyor organ, preferably a conveyor belt, which receives the loose cargo from the first conveyor organ and conveys it in the longitudinal direction of the plane to the front end of the transport means present in the cargo hold. This advantageously ensures the reception of loose cargo in the range of the cargo hold opening and its further transport 90 degrees around the corner on minimum space, and at the same time optimally adapted to the respective widths of various types of planes.

In accordance with a further preferred embodiment of the system of the invention, the second conveyor organ receives loose cargo from the front end of the transport means present in the cargo hold during unloading, transports it off in the longitudinal direction of the plane, and hands it over to the first conveyor organ which conveys the loose cargo transversely to the longitudinal axis of the plane to the cargo hold opening to hand it over to the external conveyor organ for further transport. Unloading of the loose cargo by moving it 90° around the corner out of the cargo hold into the neighboring range of the cargo hold opening is thus advantageously guaranteed.

In accordance with a further preferred embodiment of the system, the end located inside the plane's fuselage of the first conveyor organ of the intermediate conveyor means is provided with a shoulder linked to a first rail having a vertical orientation in the luggage cargo hold, so as to be vertically slidable along it. Thus advantageously a height adjustment of the end point of the first conveyor organ may be realized. Hereby it is ensured that loose cargo may be stacked across the full height of the cargo hold.

In correspondence with a further preferred embodiment of the system, it is provided that the vertically oriented first rail in turn is guided by at least one second rail having a horizontal orientation and fastened on the ceiling or in the floor. Thus a shift of the linking point transversely to the longitudinal axis of the plane across the width of the fuselage may be ensured. Hereby it is advantageously guaranteed that loose cargo may be stacked or transported into—and of course taken out again during unloading—not only across the entire height in one point of the cargo hold, but across its entire width, and as a result also across its entire width and therefore its entire volume.

In accordance with a further preferred embodiment of the system, the second conveyor organ of the intermediate conveyor means is mounted slidably relative to the first conveyor organ thereof, preferably transversely to the longitudinal axis of the plane. Thus advantageously the operating radius of the second conveyor organ of the intermediate conveyor means is expanded substantially. In a further preferred embodiment of the system, the second conveyor organ is adapted to be modifiable in length in the longitudinal direction of the plane. In this way the operating radius of the intermediate conveyor means may also advantageously be increased. In particular it is thereby ensured that in cases of particularly wide cargo hold openings, as compared with a relatively narrow intermediate conveyor means, loose cargo is nevertheless conveyed in the longitudinal direction of the plane to the front end of the transport means located in the cargo hold and handed over to it.

In a further preferred embodiment of the system, the second conveyor organ has the form of a sliding organ that is movable in the longitudinal direction of the plane. This offers a low-cost alternative for the design variant having the form of a conveyor belt. Moreover the control and operation of a longitudinally movable sliding organ may be configured more simply with corresponding final control elements or final switches. In comparison, the design of a conveyor belt offers the advantage of less wear and higher throughput rates.

In accordance with a further preferred embodiment of the system, the second conveyor organ has the form of an obliquely inclinable sliding surface. This fundamentally is the most simple variant for transporting loose cargo transversely to the main conveying direction of the first conveyor organ of the intermediate conveyor means, and thus in the longitudinal direction into the cargo hold, by gentle gliding.

In accordance with a further preferred embodiment of the system, the conveyor organ is provided for unloading with a gripping organ for grasping loose cargo. This gripping organ may be configured so that when grasping loose cargo it grips its handle, pulls it onto the second conveyor organ of the intermediate conveyor organ, and has it transported off by the latter. This gripping organ may in a particularly preferred embodiment be equipped with sensors, cameras, control circuits and/or artificial intelligence, so that it is possible to purposely select and grasp particular pieces of luggage or cargo items from the cargo hold.

In accordance with a further preferred embodiment of the system, the second conveyor organ of the intermediate conveyor means is a conveyor belt running over a rigid slide panel arranged underneath it, wherein the slide panel may be inserted between two cargo items jointly with the conveyor belt, and wherein the upper loose cargo may be transported off by the conveyor belt. Thus a low-cost variant for unloading the cargo hold at maximum possible efficiency may be provided.

What is proposed here are intermediate conveyor means for loading and unloading loose cargo in cargo holds of planes, particularly for use in a system for loading and unloading loose cargo as discussed above, wherein it is for the first time provided that it comprises at least one conveyor organ adapted to be modifiable in length in the conveying direction, preferably a conveyor belt, which receives loose cargo in the range of the cargo hold opening from the planeside end of the external conveyor organ during loading and conveys it on transversely to the longitudinal axis of the plane. Its end inside the plane's fuselage is followed by another conveyor organ, preferably a conveyor belt, which receives the loose cargo from the first conveyor organ, conveys it on in the longitudinal direction of the plane to the front end of the transport means present in the cargo hold, to deposit it on the latter. During unloading, the second conveyor organ of the intermediate conveyor means receives loose cargo from the front end of the transport means present in the cargo hold, transports it off in the longitudinal direction of the plane, and hands it over to the first conveyor organ of the intermediate conveyor means, which further transports the loose cargo transversely to the longitudinal axis of the plane to the cargo hold opening to there hand it over to the external conveyor organ for further transport.

The above discussed advantages in relation with the system of the invention are also valid for the intermediate conveyor means of the invention without restrictions.

In particular, the intermediate conveyor means may advantageously be mounted permanently in the cargo hold of the plane and herefor be optimized for the respective installation conditions of a particular type of plane. The plane's electrical system may then be utilized for power supply. As an alternative, the intermediate conveyor means of the invention may also be arranged at the one end facing the cargo hold opening, or projecting into it, of the external conveyor organ capable of travelling on the tarmac, and optionally may be supplied by the latter with an operating voltage. Thus it is advantageously ensured that the equipment necessary for loading and unloading may already be provided at the airport by the company entrusted with these tasks, and training on these apparatus is possible.

In a further preferred embodiment of the intermediate conveyor means in accordance with the invention, the end inside the plane's fuselage of the first conveyor organ of the intermediate conveyor means is provided with a shoulder, whereby it is linked, for example, to a first rail having a substantially vertical orientation in the luggage space so as to be vertically slidable along it. Thus advantageously a height adjustment of the end of the first conveyor organ facing the inside of the plane may be ensured across the entire height of the luggage space. As was already discussed beforehand concerning the system, one thus obtains the advantage that the entire stowing height of the luggage space may be utilized. In the case of the variant permanently arranged in the plane, the vertically oriented rail may movably be supported by its upper and/or lower end against a second rail having a substantially horizontal orientation, so as to be movable in the longitudinal direction of the latter. The horizontal rail may in turn be supported in a suitable manner against the structure of the cargo hold. In the case of the variant connected with the external conveyor organ, the vertical rail may be guided in a horizontally movable manner through the intermediary of a corresponding rack or a suitably designed frame. It is moreover conceivable to provide linking of the shoulder of the intermediate conveyor organ at first on a rail having a substantially horizontal orientation, which in turn is mounted for sliding along a vertically oriented rail, wherein the vertically oriented rail may be supported against the plane's structure if the intermediate conveyor organ is permanently mounted in the plane, and in the case of a combination with the conveyor organ capable of travelling on the tarmac may be connected to the latter through the intermediary of a frame, a rack, or the like.

Accordingly it is proposed in a further preferred embodiment of the intermediate conveyor means that the vertically oriented first rail is in turn guided by at least one second rail having a horizontal orientation and fastened on the ceiling and the floor, for shifting the linking point transversely to the longitudinal axis of the plane.

Thus it is not only ensured that the entire width of the cargo hold may be utilized, but a construction having maximum stability and free from torsion is obtained. Instead of a horizontally oriented second rail fastened at the floor or on the ceiling, the first rail may also be guided in a horizontal direction in a correspondingly designed rack or frame, which in turn is fastened at the external conveyor organ, so that even in the case of the variant of intermediate conveyor means fastened at the external conveyor organ, the full use of the entire cargo hold width and depth and also height is advantageously ensured.

What is proposed here is a system for loading and unloading loose cargo in a cargo hold, particularly of a plane, comprising transport means covering the area of the floor of the cargo hold for particularly intermittently conveying the loose cargo towards the inner end of the cargo hold during loading, or away from it during unloading, wherein the front end of the transport means reaches into the range of the cargo hold opening inside the fuselage, and a conveyor organ connecting to the outside of the plane at the cargo hold opening for transporting the loose cargo between the level of the tarmac and the cargo hold opening. In this system, there is for the first time arranged between the plane-side end of the external conveyor organ and the front end of the transport means in the cargo hold at least one intermediate conveyor means, whereby the loose cargo may during loading initially be conveyed deeper into the fuselage, substantially transversely to the longitudinal axis of the plane, whereupon the loose cargo may then be rotated manually in the cargo hold and transported further substantially in the longitudinal direction of the plane and deposited on the front end of the transport means in the cargo hold, and whereby during unloading, loose cargo conveyed beyond the front end of the transport means into the plane of the cargo hold opening may be transported off substantially transversely to the longitudinal axis of the plane through the cargo hold opening.

This second variant for the above discussed first variant of the system of the invention essentially offers the same advantages as discussed above for the first variant of the system.

Furthermore this partly automated variant of the system of the invention results in additional advantages. Thus, for example, the labor of ground personnel who are in any case present may further be used during loading and unloading of planes. Workplaces are not abolished unnecessarily. The working conditions in the workplaces thus preserved are improved substantially. Namely, during loading and unloading of loose cargo, the person working in the cargo hold is no longer exposed to the risk of having to heave any heavy pieces of luggage by a corresponding twist of the torso or of the spine relative to the hip with a corresponding exertion over the shoulder, for example from the bottom right to the top left, or vice versa, or otherwise. Thus the massive risks to the spine or to the intervertebral disks as known from the prior art and discussed above, with the resulting long-time damages to the personnel working in the cargo hold, which are not even avoided in the conveyor devices known from DE 100 07 332 A1 or from WO 98/54073, are excluded in the presently discussed system of the invention.

Namely, a person working in the cargo hold merely needs to receive the cargo items, that are automatically conveyed from outside and into the cargo hold, for example while sitting or kneeling in the range of the cargo hold opening and having the chest, or view, oriented in the longitudinal direction of the plane, through the cargo hold opening which is located at the side of this person. Then, this person may orient the loose cargo rotatably placed in front on the intermediate conveyor means in the longitudinal direction of the plane without any strain to the back or any particular effort, to then move it on to the transport means covering the area of the cargo hold by lightly shoving it away from the body.

Heaving, hurling or lifting of pieces of luggage as known from the prior art and involving twisting of the back from the hip over the shoulder is here avoided entirely. Workplaces are thus not only secured, but at the same time the risk of injury is reduced drastically, and yet at the same time productivity and efficiency during loading and unloading of loose cargo are enhanced substantially in comparison with the solutions known from the prior art. Not least, a workplace thus improved helps improve the working climate, increase the employees' motivation, which finally translates into an increased efficiency.

In addition, there result further advantages. Thus it is possible both with the system of the invention and with the intermediate conveyor means in accordance with the invention to continue unrestricted use of ground-supported conveyor devices already existing at airports, whereby loose cargo may be taken from the tarmac into the range of the cargo hold opening of the plane. Placing these out of service or even scrapping them is thereby avoided. This enormously helps save costs.

In addition, their usability is expanded substantially by the system of the invention and by the intermediate conveyor means in accordance with the invention. In comparison with solutions as proposed, e.g., by DE 100 07 332 A1 or WO 98/54073, which may easily incur costs EUR 200,000 and more per realized installation, this is even done at very low cost, for the intermediate conveyor means of the invention does not require any major investments when one considers an estimated initial cost of about EUR 5,000, and thus ¹⁄₄₀ of the above mentioned sum. Even when one assumes in such a consideration of economic efficiency that the transport means covering the floor of the cargo hold has to be included in the calculation, and estimates its prime cost at about EUR 35,000, this would result in overall costs for the system of the invention of about EUR 40.000, which still is only ⅕ of the above mentioned sum. Thus there results a substantial cost advantage in comparison with known solutions.

In addition, the system of the invention and the intermediate conveyor means of the invention may be serviced substantially more simply, resulting in clearly lower maintenance costs. Independently of this, both the system of the invention and the intermediate conveyor means of the invention are simple to manipulate and operate, so that extensive training of personnel working with it is not necessary. When one considers on top of this that even a minor airport requires, e.g., five conveyor devices for just attending to five planes at a same time—which does not represent a major flight volume—then solutions in accordance with the basic principle of DE 100 07 332 A1 or WO 98/54073 quickly result in investment volumes of more than EUR 1,000,000, which are offset by mere investments of EUR 200,000 for the system of the invention in the considered example. The economical advantage thus is immense.

In addition, the system of the invention and the intermediate conveyor means of the invention offers the immense advantage that owing to the easy manipulation, positioning of the intermediate conveyor means for bridging the distance from the end of the external ground-supported conveyor organ facing the cargo hold opening end into the cargo hold, and thus through the cargo hold opening, may be effected without any risk of damage to fuselage or cargo hold opening, for it is not necessary any more to move the ground-supported external conveyor organ—which usually is manoeuvered only with difficulty—into the cargo hold opening, but it may be positioned at a sufficient safety distance from the cargo hold opening. Thus a damage to the fuselage and the cargo hold opening is excluded.

Finally it is possible with the system of the invention and the intermediate conveyor means provided therefor to substantially shorten the time for loading and unloading a plane, and thus reduce the operating costs.

Thus, for example, it is provided in the system of the invention that the intermediate conveyor means includes a sliding element, preferably a wheel, at its lower side in the range of overlap with the external conveyor organ. Hereby a slidable support of the intermediate conveyor means on the upper side of the external conveyor organ in the end range thereof is achieved. As a result, the end of the intermediate conveyor means present in the cargo hold of the plane may be moved across the width of the cargo hold or of the fuselage, at will and according to need. In one preferred embodiment of the intermediate conveyor means, a total length thereof of about 1.50 m advantageously is already sufficient. As an alternative, the entire length of the intermediate conveyor means might be kept variable.

Furthermore it is provided in a preferred embodiment of the system of the invention that in the range of overlap with the external conveyor organ an outrigger is linked to the intermediate conveyor means, which is supported by its end facing away from the intermediate conveyor means, by means of an articulation linked there, against a sliding rail oriented in parallel with the longitudinal direction of the external conveyor organ and fastened to the latter. This results in a slidable support of the intermediate conveyor means in the conveying direction of the external conveyor organ. This advantageously results in a kind of forced guiding of the intermediate conveyor means and thus a permanently correct orientation of the beginning of the intermediate conveyor means supported on the end range of the ground-supported external conveyor organ, so that during operation it is always ensured that supplied loose cargo may readily and without error handed over from the external ground-supported conveyor device to the intermediate conveyor means. At the same time this type of slidable support of the intermediate conveyor means allows for strength-saving and easy slidability thereof with a simultaneously ensured easy handling.

Where necessary, brake means may in addition be provided in the range of the articulation that is supported against the sliding rail, which brake means aids in purposely inhibiting excessively easy slidability of the intermediate conveyor means where necessary. Furthermore a locking brake for immobilization is conceivable.

Moreover the outrigger offers the advantages that the beginning of the intermediate conveyor means is permanently forcibly guided in the conveying direction of the external ground-supported conveyor organ, but at the same time the end of the intermediate conveyor means located in the cargo hold may be pivoted relative to the beginning thereof, so that the person working in the cargo hold may at any time carry out an optimum adaptation of the overall orientation of the intermediate conveyor means to the current work process. In this way, any desired spot for depositing loose cargo on the transport means located in the cargo hold and covering the surface thereof may be reached across the entire with of the cargo hold or of the fuselage, respectively, in the range of extension of the cargo hold opening.

In correspondence with a further preferred embodiment it is provided that the end of the intermediate conveyor means facing the front end of the transport means in the cargo hold is adjustable in height relative to the beginning of the intermediate conveyor means facing the external conveyor organ. Thus it is advantageously ensured that supplied loose cargo may reach any point of the cargo hold section in the cargo hold, even in the height, without the person working in the cargo hold having to exert himself to this end, e.g., by actively lifting the loose cargo.

In a further preferred embodiment of the system it is provided that an end portion of the intermediate conveyor means is capable of being pivoted about an axis transversely to the conveying direction of the intermediate conveyor means, such that this end portion may be oriented horizontally. Thus it is advantageously achieved that loose cargo finally having arrived at this end portion on its conveying path is in any case at the same time in such a horizontal orientation that it may, without great effort, from there be deposited directly on loose cargo already present in the cargo hold, or, where loose cargo is not stowed away in the cargo hold yet, directly on the transport means located in the cargo hold. Conversely during unloading, there results the advantage that loose cargo supplied through the transport means located in the cargo hold may be dragged without further effort onto the end portion of the intermediate conveyor means which permanently has a horizontal orientation, and then may be supplied to further conveying out of the cargo hold.

In a further preferred embodiment of the system of the invention it is provided that a leading portion of the intermediate conveyor means is oriented at a predetermined angle of inclination, preferably between 10° to 30°, with the angle of inclination of the external conveyor organ. By such a gentle, ramp-type transition from the external ground-supported conveyor organ to the intermediate conveyor means it is advantageously ensured that loose cargo of any kind may readily be handed over from the external conveyor organ to the intermediate conveyor means. Backups or even interruptions are avoided in this range. At the same time, this angle of inclination results in a good compromise between a gentle transition from the external conveyor organ to the intermediate conveyor means and the construction space to be provided in this range for construction measures, such as connection for the outrigger, accommodating, e.g., an electric motor for driving the conveyor belts, formation of a supporting frame for linking the above mentioned sliding element or support wheel, etc.

In accordance with a further preferred embodiment, it is provided that the intermediate conveyor means including its conveying direction for conveying loose cargo substantially transversely to the longitudinal axis of the plane may be pivoted about an angular range of about −30° to +30° relative to the conveying direction of the external conveyor organ. Pivotability in a range of about −30° to +30° advantageously ensures the desired conveying of the loose cargo substantially transversely to the longitudinal axis of the plane, or into the depth of the cargo hold, without having to do without an appropriate variation of the end range of the intermediate conveyor means in the longitudinal direction of the plane, so that thus a range defined by the width of the cargo hold opening and the width of the cargo hold section may readily be reached with the end portion of the intermediate conveyor means.

In correspondence with a further preferred embodiment it is provided that parts of the supporting structure of the intermediate conveyor means are manufactured of lightweight materials such as aluminum or fiber composites. Thus it is ensured that the part of the intermediate conveyor means outwardly projecting from the end portion of the external ground-supported conveyor organs—projecting to a greater or lesser degree during loading and unloading of loose cargo in the cargo hold depending on the set position of the end of the intermediate conveyor means—may always be held such that the entire center of gravity of the intermediate conveyor means will remain inside the range of overlap with the external conveyor organ, so that the projecting part is prevented from tilting over even by the distribution of its own weight. This offers the additional advantage that in operation, and thus in the condition loaded with loose cargo, merely the additional weight of the cargo items being conveyed has to be supported by the outrigger that is linked to the sliding rail by means of the articulation, which latter then equally does not present any problems in terms of construction. As an alternative, a hoop encompassing or reaching underneath the external ground-supported conveyor organ or the like may be provided, whereby tilting of the projecting part of the intermediate conveyor means may equally be precluded. At the same time, the lightweight construction of the intermediate conveyor means offers the advantage that it is furthermore easy to handle under the aspect of its weight.

The above discussed object is achieved, in respect of the intermediate conveyor means, i.a. in such a manner that an intermediate conveyor means for loading and unloading loose cargo in cargo holds of planes, particularly for use in a system as discussed above, is proposed, wherein it is provided for the first time that the intermediate conveyor means comprises at least one first frame supported against an external conveyor organ with a first conveyor organ, preferably a first conveyor belt, for receiving loose cargo during loading, preferably in the range of the front hold opening of the plane, from the end of the external conveyor organ facing the plane, and conveying it on substantially transversely to the longitudinal axis of the plane. Furthermore it is provided that the end of the first conveyor organ is followed by a second conveyor organ, preferably a second conveyor belt, preferably for bridging the distance at the end of the external conveyor organ to the inside of the cargo hold, for receiving loose cargo during loading, preferably in the range of the front hold opening of the plane, from the end of the first conveyor organ, and conveying it on substantially transversely to the longitudinal axis of the plane. Here it is moreover provided for the first time that the end thereof is followed by a third conveyor organ, preferably a roller panel, for receiving loose cargo during loading from the end of the second conveyor organ and permitting manual rotation of the loose cargo located thereon, such that the loose cargo may be conveyed on substantially in the longitudinal direction of the plane to the front end of transport means present in the cargo hold.

In a further preferred embodiment of the intermediate conveyor means in accordance with the invention, it is provided that during unloading, loose cargo may be applied manually on the third conveyor organ from the front end of the transport means present in the cargo hold substantially in the longitudinal direction of the plane, rotatably placed there, and supported suitably for handover to the second conveyor organ, wherein the second conveyor organ conveys the loose cargo substantially transversely to the longitudinal axis of the plane to the cargo hold opening and/or through the latter and hands it over the first conveyor organ, which conveys the loose cargo on substantially transversely to the longitudinal axis of the plane to the external conveyor organ and hands it over to the latter for further transport.

One or more of the above identified objects are furthermore achieved through another variant of the intermediate conveyor means in accordance with the invention according to Claim 39. In the case of this intermediate conveyor means in accordance with the invention for loading and unloading loose cargo in cargo holds of planes, particularly for use in a system as discussed above, it is for the first time provided that the intermediate conveyor means comprise at least one first frame supported against an end portion of an external ground-supported conveyor organ reaching from outside into the cargo hold of the plane and comprising a first conveyor organ, preferably a first conveyor belt, which during loading receives loose cargo from the end portion of the ground-supported conveyor organ and conveys it on. Furthermore it is provided that the end of the first conveyor organ is followed by a second conveyor organ, preferably a second conveyor belt, preferably for bridging the distance from the end portion of the ground-supported conveyor organ to the location of deposition the loose cargo in the cargo hold, which receives loose cargo during loading from the end of the first conveyor organ and to convey it on. Finally it is moreover provided for the first time that its end is followed by a third conveyor organ, preferably a roller panel, which receives loose cargo during loading from the end of the second conveyor organ and permits a manual rotation of the loose cargo rotatably placed thereon, such that the loose cargo may be further transported to the location of deposition the loose cargo in the cargo hold essentially in the longitudinal direction of the plane.

In accordance with a preferred embodiment it is provided that during unloading, the loose cargo may be manually applied on the third conveyor organ from its location of deposition in the cargo hold, preferably substantially in the longitudinal direction of the plane, rotatably placed thereon, and supported so as to be capable of being handed over to the second conveyor organ, with the second conveyor organ further conveying the loose cargo and having it over to the first conveyor organ, which conveys the loose cargo on to the end portion of the ground-supported conveyor organ reaching from outside into the cargo hold of the plane and hands it over to the latter for further transport.

Thus the advantages already mentioned above in respect of the already discussed variants of the system and intermediate conveyor means may advantageously also be transferred, by means of the system of the invention or of the intermediate conveyor means in accordance with the invention, to external ground-supported conveyor organs or the like that reach into the cargo hold and essentially correspond, e.g., to the principle described in DE 100 07 332 A1 or WO 98/54073 A1 or WO 01/51356 A1.

In the case of this variant of the conveyor unit of the invention for loading and unloading loose cargo, such as particularly pieces of luggage or the like in a cargo hold of a plane, the loose cargo may be transported by supplying it from externally of the plane from the tarmac level to the cargo hold and conveying it further through the latter into the cargo hold. The conveyor unit comprises a first conveyor organ for transporting the loose cargo in the cargo hold. With the aid of the first conveyor organ, loose cargo supplied from externally of the plane during loading of the cargo hold may be conveyed in the cargo hold both transversely and longitudinally to the longitudinal axis of the plane into the fuselage to the range of a location of deposition. By means of the first conveyor organ, loose cargo may be conveyed back during unloading from the range of the location of deposition into the plane of the cargo hold opening, so that the loose cargo may from there be transported off to the outside transversely to the longitudinal axis of the plane through the cargo hold opening.

Here it is proposed for the first time that the end of the first conveyor organ located inside the fuselage in the cargo hold is horizontally slidable or pivotable transversely to the longitudinal axis of the plane and comprises a subsequent second conveyor organ having a subsequent third conveyor organ. Here a height adjustment of the third conveyor organ in the cargo hold may be achieved by an adjustment of the inclination of the second conveyor organ. Furthermore during loading, the loose cargo may purposely be deposited on the desired location of deposition in the cargo hold by the third conveyor organ—powered by conveyor means of the third conveyor organ or automatically—and during unloading purposely fetched or picked up and transported off—powered by conveyor means of the third conveyor organ or automatically.

Thus in case of loading, the person present in the cargo hold and charged with loading and unloading the plane's cargo hold may, in a particularly advantageous manner, pass on loose cargo arriving from outside at the end of the first conveyor organ located in the cargo via the second and the third conveyor organs without using muscular strength, to the desired location of deposition, and from there have it deposited by the third conveyor organ on the provided location of deposition either powered or automatically without a considerable effort of his own. During unloading the cargo hold, this person may accordingly fetch or pick up loose cargo from its location of deposition powered or automatically without a considerable effort by means of the third conveyor organ, have it handed over by the third conveyor organ to the second conveyor organ, and transported off by the first conveyor organ towards the cargo hold opening, from where it may be conveyed further through the cargo hold opening to the outside towards the tarmac.

This person thus does not have to lift the cargo items or pieces of luggage any more in a kneeling or bent position by a twisting motion from the loins across the shoulder in a frequently quite narrow, so-called "narrow body" cargo hold of a plane, which would result in lasting damage to the spine. The conveyor unit of the invention thus advantageously brings about a relief for this person's back and thus avoids a risk to the person's health. By the system of the invention or of the conveyor unit, any point or place in the cargo hold may purposely be reached, so that the entire stowing space or the full payload capacity of the cargo hold of a plane may be utilized.

The advantages already discussed above for the system or for the intermediate conveyor means may analogously also be attained by the conveyor unit presently discussed.

Conversely, the advantages presently already discussed for the conveyor unit of the invention on the desired location of deposition during loading or picking up of loose cargo during unloading with regard to the powered or automatic deposition of loose cargo that may be achieved with regard to the third conveyor organ, may also analogously be attained by the system and intermediate conveyor means already discussed above with the corresponding last conveyor organ.

Thus, e.g., means or elements for supporting the lifting, lowering, or pivoting movement of the second and/or of the third conveyor organ are provided. These may be, e.g., a powered parallelogram linkage arranged on either side of the edges of a conveyor organ, a spring-loaded cylinder, electrically operated final control elements, or the like components. Thus the required position change for alternating deposition places of loose cargo may be predetermined by the person working in the cargo hold approximately free of effort to automatically powered, depending on the embodiment.

Furthermore a multi-function operating element is provided, whereby for instance the horizontal orientation of the third conveyor organ, the inclination of the second conveyor organ, the position of the first conveyor organ in the cargo hold, the conveying direction, the conveying velocity, or further functions may be controlled. The person working in the hold may cause the conveyor unit by operating the multi-function operating element to purposely deposit a particular loose cargo or piece of luggage in a particular place during loading, or pick it up from a selected place during unloading.

A particularly preferred embodiment of the conveyor unit of the invention comprises a third conveyor organ provided with conveyor means having the form of a conveyor belt. The conveyor belt runs over a rigid slide panel arranged underneath. Thus it is ensured that the conveyor means having the form of a conveyor belt have a sufficiently high area stiffness, so that sagging of the conveyor belt is excluded even when carrying small and at the same time heavy pieces of luggage. Furthermore it is provided that deflection roller of the conveyor belt that faces the loose cargo has such a small diameter that the tip of the third conveyor organ thus formed, or the very the third conveyor organ, has a spatula or tongue shape when viewed in a longitudinal section. In this way the third conveyor organ may optionally at least partly be inserted between two vertically stacked pieces of luggage, so that then the upper piece of luggage resting on the conveyor belt may be dragged up by the conveyor belt and carried along. In the same way, during loading a piece of luggage or loose cargo even be placed closely under the lower edge or ceiling of the cargo hold on the top layer of a stack of loose cargo, for the third conveyor organ itself hardly occupies space in the height direction. Thus the available stowing space in the cargo hold may be utilized as far as possible even in the height. The spatula or tongue-shaped configuration of the third conveyor organ when viewed in the longitudinal section also permits to lower it particularly close to the floor of the cargo hold, so that, e.g., even flat pieces of luggage resting directly on the cargo hold floor may be picked up automatically by the third conveyor organ by inserting the tip of the third conveyor organ under the loose cargo resting on the cargo hold floor and drawing the loose cargo onto the conveyor belt while the conveyor belt runs backwards. Depending on the embodiment of the conveyor unit, the third conveyor organ may automatically move into the stack of loose cargo in accordance with the specifications of an operator at the multi-function operating element, or even automatically in accordance with the instructions from the control systems, to there take up pieces of luggage during unloading or move them to a particular position of the stack of loose cargo during loading, in order to purposely deposit loose cargo there. Where necessary, the person working in the cargo hold may intervene in cases of occurring problems and optionally assist by hand.

In a particularly preferred embodiment of the conveyor belt, the coefficient of friction ### between at least part of the loose cargo and at least part of the surface of the conveyor belt facing the loose cargo is more than 0.50. In a particularly preferred variant, the coefficient of friction ### is more than 0.60, and in a particularly preferred manner more than 0.70. Thus it is ensured that even pieces of luggage having a particularly smooth surface structure, such as hard-shell suitcases, metal suitcases, aluminum boxes, smooth canvas bags or the like, may readily be taken up by the conveyor belt of the third conveyor organ just as well as pieces of luggage having a surface with a substantially better grip, such as conventional leather suitcases, leather bags, soft-shell suitcases, cloth sacks, or other pieces of luggage of linen, leather or soft plastics or the like, even if the third conveyor organ at first has to pull them close, out, or off a disorderly stack of pieces of luggage lying on top of each other. Thus it is moreover ensured that during loading, such cargo items may readily be placed by the third conveyor organ onto already present cargo items, even if the loose cargo to be placed down would have to be shifted to or across the already deposited loose cargo by the third conveyor organ by correspondingly overcoming the frictional forces prevailing between the two cargo items. With coefficients of friction of 0.40 to 0.80 and preferably between 0.50 to 0.75 between the loose cargo and the conveyor belt for the above mentioned materials of loose cargo or pieces of luggage, and a corresponding structure of the surface facing the loose cargo of the conveyor belt, it may regularly be conveyed or shifted without any problems.

In a preferred variant it is moreover provided that the conveyor belt has on its surface thereof facing the loose cargo friction-increasing means, such as particularly roughings, studs, ribs, webs, grains, applied foam or cellular rubber pieces, or the like. Such friction-increasing means may also be provided by giving the conveyor belt a multi-layer construction. The structure of a middle layer may be selected such that the length and optionally transverse forces manifesting in the conveyor belt may readily be handled by the conveyor belt. A layer inwardly facing the deflection or drive rollers is selected such as to ensure optimum driving of the conveyor belt. A layer outwardly facing the pieces of luggage may be equipped in portions thereof or entirely with corresponding friction-increasing coatings or the like.

By such friction-increasing means it is to be ensured that loose cargo having any position may be pulled out from a stack of possibly randomly stacked cargo items, or a loose cargo item resting on top may be pulled off such a stack, be taken up by the conveyor belt of the third conveyor organ, and handed over to the second conveyor organ. Preferred materials for the coating of at least parts of the outwardly directed surface of the conveyor belt are, for example, various types of rubber, cellular rubber applications, soft or adhering plastics coatings or plastics applications, or the like. As an alternative, it is conceivable to increase the roughness of the outwardly directed surface of the conveyor belt.

As an alternative for the conveyor means of the third conveyor organ preferably having the form of a conveyor belt, or also complementary thereto, the third conveyor organ may comprise as the conveyor means a movable sliding organ, obliquely inclinable, a gripping organ or the like actuators, as was already discussed for the above described variants of systems or intermediate conveyor means of the present invention. Thus it is possible to form further different embodiments of the third conveyor organ, all of which have the purpose that in the ideal case the person present in the cargo hold need not exert any forces to the loose cargo, but that such forces are applied by the above mentioned conveyor means or actuating elements associated with the third conveyor organ. Thanks to such actuating elements, loose cargo may be deposited on the desired location of deposition or taken up from there while saving the strength of the operator and thus protecting his health. In the presently discussed variant of a conveyor unit, the use of sliding organs, gripping organs or the like conveyor means complementing or even replacing the conveyor belt of the third conveyor organ is connected with additional constructional expense when considering the moving direction of the loose cargo to be conveyed, that is essentially the same as the moving direction of the conveyor means in the case of the third conveyor organ, in order to be able to ensure that the conveyor means used will not in an unacceptable degree restrict or even hinder the freedom of movement of the loose cargo to be conveyed. The required expenditure for structural adaptation may, depending on the application, be justified particularly for fully automatic conveyor units because of a higher throughput of loose cargo, an improved error tolerance, and an enhanced reliability thereby achieved.

In another preferred variant it is provided that automatic control systems communicating with the end of the first conveyor organ located in the cargo hold and/or with the second conveyor organ and/or with the third conveyor organ are provided that may include, for example, sensors, cameras, control circuits, artificial intelligence, actuators, motor operators or the like. In this way a self-controlled, automatically operating, possibly even learning and thus self-optimizing system, or a conveyor unit operating in such a manner may be created, so that persons in the cargo hold are not necessary any more. Thus a risk to these persons is entirely excluded. Not least, with such an automated system or such an automated conveyor unit it is possible to attain substantially higher throughput rates during loading and unloading of planes. Finally the data of the control systems may be recorded and called up, so that their proper function may be monitored and demonstrated, where necessary, or a need of servicing, which cannot be excluded entirely, may be detected early on and a specific maintenance may be carried out.

With the above discussed variant of the conveyor unit of the invention, a person present in the cargo hold may advantageously entirely refrain from manually depositing loose cargo from the end of the conveyor unit located in the cargo hold on the provided location of deposition, which partly requires considerable exertion of strength, or during unloading taking them away from there and carrying them to the front end of the conveyor organ. Thus a complete relief of this person is possible. During loading and unloading of the cargo hold even in "narrow-body" planes, for instance, a risk to the health of the personnel working there need not be feared despite the prevailing cramped space conditions. In addition, the fully automatic variant of a conveyor unit in accordance with the invention offers the option of entirely doing away with personnel during loading and unloading in the cargo hold, so that a related health risk is excluded fundamentally, the costs during loading and unloading may be lowered correspondingly, and this personnel lastly is available in another location for different tasks.

BRIEF DESCRIPTION OF THE DRAWINGS

The invention shall in the following be explained in more detail through practical examples by referring to the figures of the drawing, wherein:

FIG. 17 shows a schematically simplified lateral view of an alternative embodiment of the system of the invention as well as of an alternative embodiment of the intermediate conveyor means in accordance with the invention, during loading;

FIG. 18 shows the alternative embodiment of the system as well as of the intermediate conveyor means as shown in FIG. 17, during unloading;

DETAILED DESCRIPTION

Figure 1:
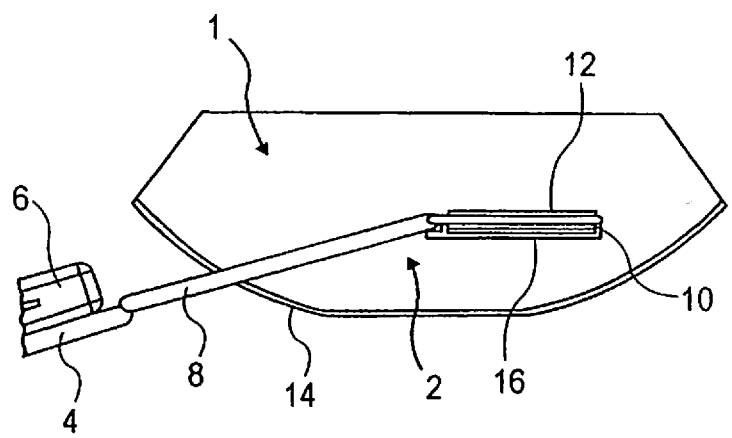
FIGS. 1 and 1A show a schematically simplified sectional view and a schematically simplified top view of a cargo hold in a plane having arranged therein an exemplary embodiment of intermediate conveyor means in accordance with the invention during loading, which is linked to the tarmac conveyor organ.
Figure 1A:
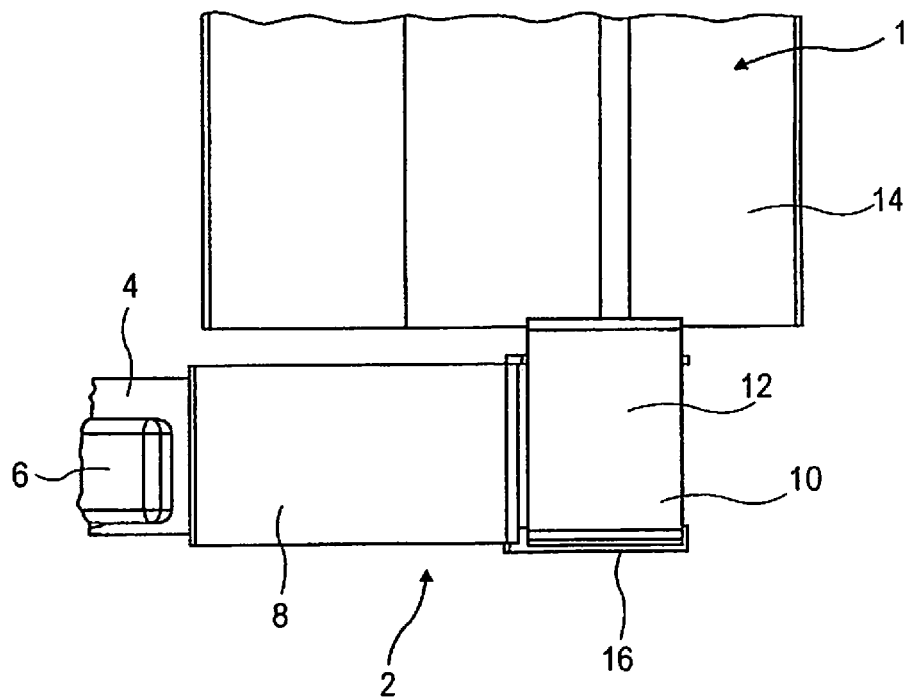

FIG. 1 shows in a schematically simplified sectional view and in a schematically simplified top view a cargo hold 1 of a plane (not shown) having arranged therein a first exemplary embodiment of intermediate conveyor means 2 in accordance with the invention during loading. The intermediate conveyor means 2 are linked to a tarmac conveyor organ 4 represented only partially cut open, which conveys loose cargo 6 partially shown in sectional view. The tarmac conveyor organ is capable, in accordance with the above discussion, of travelling on the tarmac.

The intermediate conveyor means 2 comprise in FIG. 1 a first conveyor organ 8 that reaches from the tarmac conveyor organ 4 through the cargo hold opening into the cargo hold 1, with the first conveyor organ 8 here exemplarily having the form of a conveyor belt, as well as a second conveyor organ 10. The second conveyor organ 10 comprises a conveyor portion 12 having the form, e.g., of a conveyor belt capable of being modifiable in length in the longitudinal direction thereof and thus in the longitudinal direction of the plane, which in the present representation reaches as far as the front end, which faces the cargo hold opening (not shown), of transport means 14 lining the floor (not shown) of the cargo hold 1, wherein the transport means 14 may, e.g., have the form of a transport carpet.

The second conveyor organ 10 is linked to the first conveyor organ 8 and may be pivoted relative to the latter. The second conveyor organ 10 comprises a rack or frame-type structure 16 whereby the length-modifiable conveyor portion 12 is supported. The loose cargo 6 is transported from the tarmac conveyor organ 4 to the first conveyor organ 8 of the intermediate conveyor means 2 and from there transported on to the second conveyor organ 10, so that it moves further into the cargo hold 1 transversely to the longitudinal axis of the plane and may then be handed over in the longitudinal direction of the cargo hold 1 from the second conveyor organ 10 to the transport means 14, from where it may be transported further into the depth of the cargo hold 1.

In the further development of the description of the figures, parts or elements having identical or similar functions shall be designated by the same reference numerals as in the first embodiment.

Figure 2:
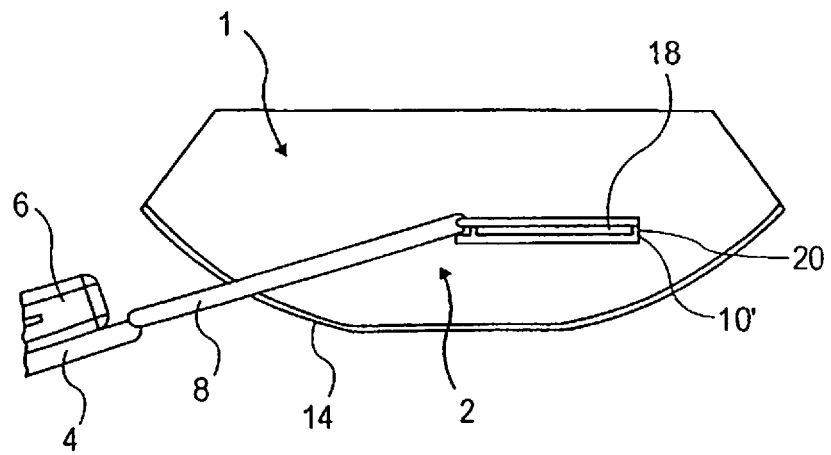
FIGS. 2 and 2A show a schematically simplified sectional view and a schematically simplified top view of the intermediate conveyor means as shown in FIG. 1 and FIG. 1A, which is linked to the tarmac conveyor organ, comprising a second variant of the second conveyor organ during loading with the second conveyor organ partly extended.
Figure 2A:
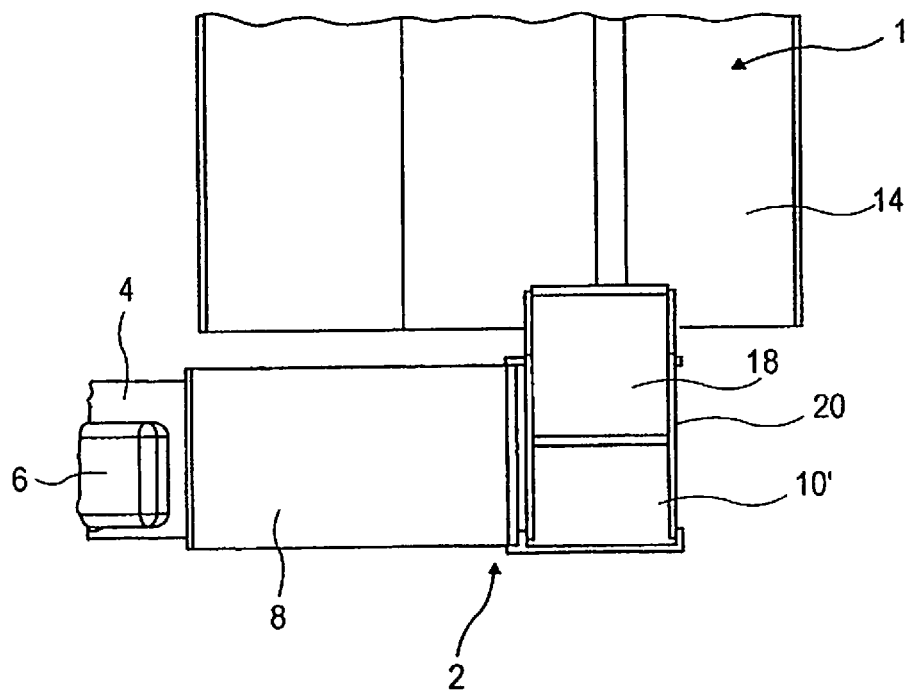

FIG. 2 represents in a schematically simplified sectional view and in a schematically simplified top view the intermediate conveyor means 2 shown in FIG. 1 with a second variant of the second conveyor organ 10' during loading, with the second conveyor organ 10' represented partly extended. The second conveyor organ 10' comprises a panel 18 that is displaceable in the longitudinal direction of the conveyor organ 10' and guided in a rail-type guide structure 20 and in the shown representation is extended in the longitudinal direction of the plane such as to reach above the front end of the floor-side transport means 14. Thus it is ensured that loose cargo 6 may be handed over continuously from the intermediate conveyor means 2 to the transport means 14.

Figure 3:
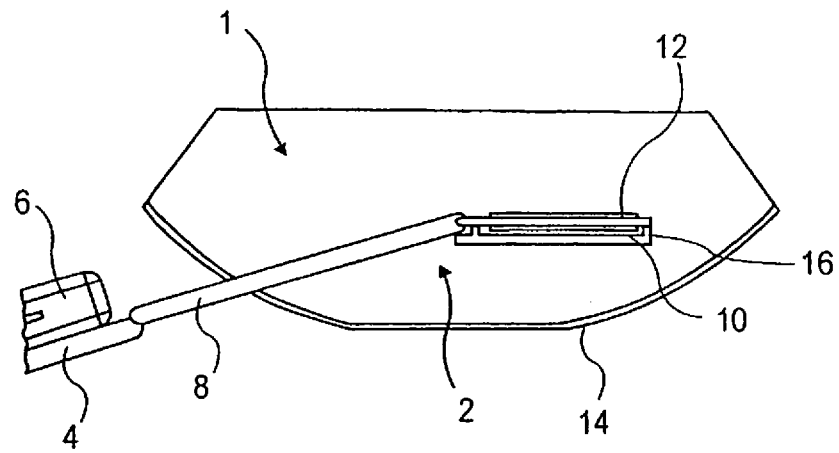
FIGS. 3 and 3A show a schematically simplified sectional view and a schematically simplified top view of the intermediate conveyor means as shown in FIGS. 1 and 1A and 2 and 2A during loading with the first variant of the second conveyor organ shown in FIG. 1 having its length prolonged in the longitudinal direction thereof.
Figure 3A:
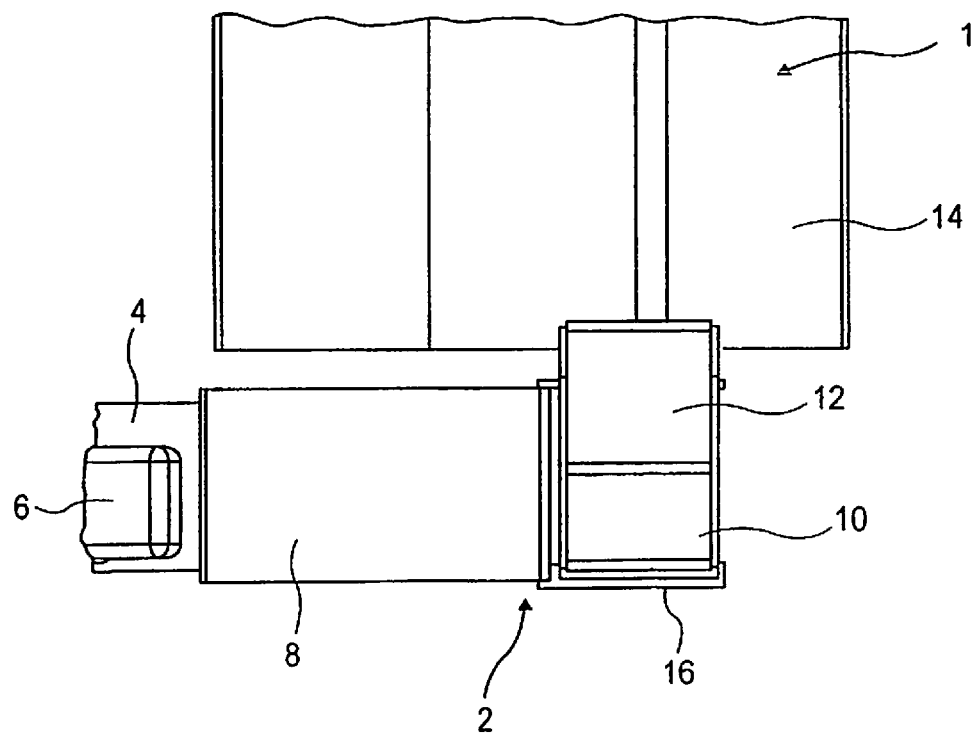

FIG. 3 represents in a schematically simplified sectional view and in a schematically simplified top view the intermediate conveyor means 2 shown in FIGS. 1 and 2 with the first variant of the second conveyor organ 10 as already shown in FIG. 1. The second conveyor organ 10 has a length of the conveyor portion 12 increased in the longitudinal direction thereof, so that its end projecting into the cargo hold 1 in the longitudinal direction moreover projects above the transport means 14, as is visualized in FIG. 1. In this way, too, it may be ensured that loose cargo positively arrives from the intermediate conveyor means 2 at the transport means 14.

Figure 4:
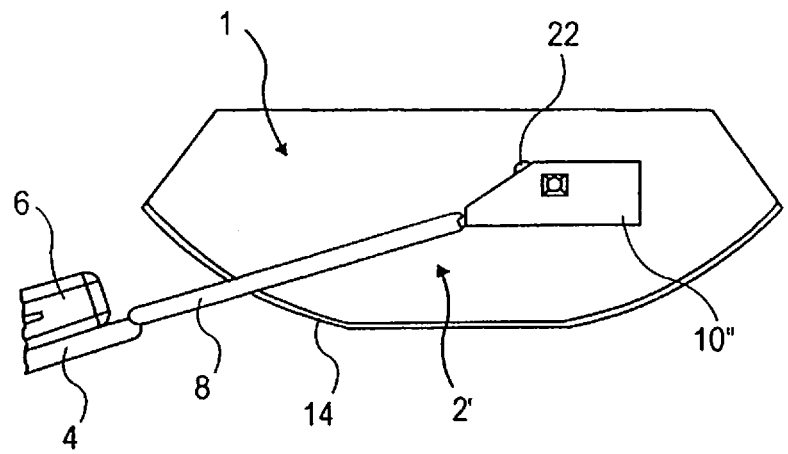
FIGS. 4 and 4A show a schematically simplified sectional view and a schematically simplified top view of a second variant of intermediate conveyor means during loading with a second conveyor organ comprising a sliding organ.
Figure 4A:
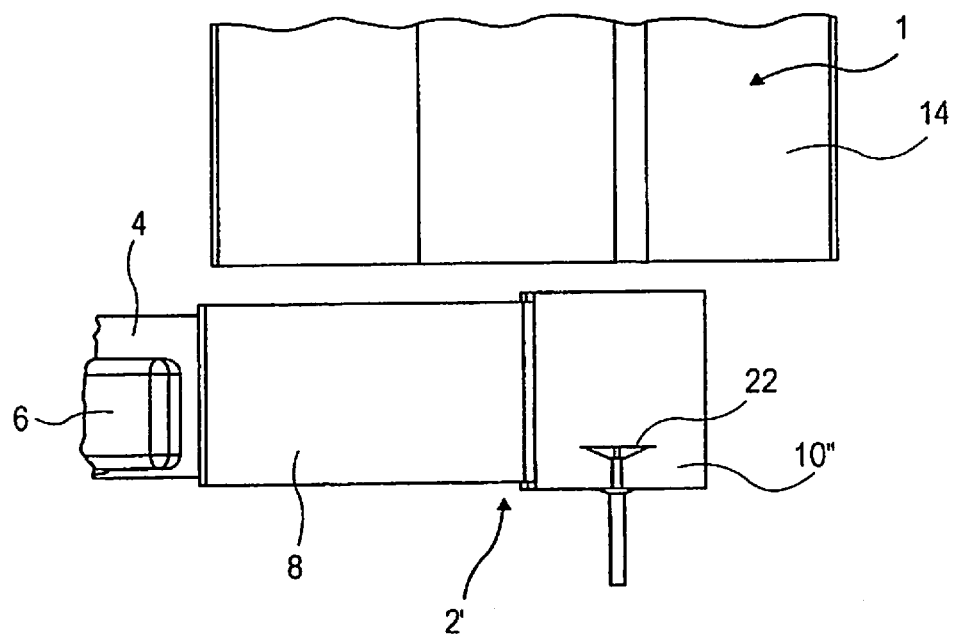

FIG. 4 shows in a schematically simplified sectional view and in a schematically simplified top view a second variant of intermediate conveyor means 2' during loading. The second variant of the intermediate conveyor means 2' comprises another variant of the second conveyor organ 10" which in turn comprises a sliding organ 22. By means of the sliding organ 22, loose cargo 6 is pushed into the cargo hold 1 in the longitudinal direction of the plane and onto transport means 14 positioned there.

Figure 5:
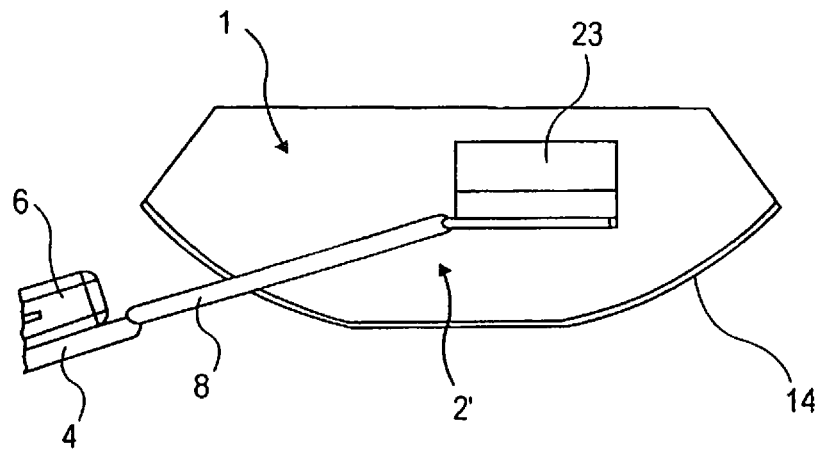
FIGS. 5 and 5A show a schematically simplified sectional view and a schematically simplified top view of intermediate conveyor means as shown in FIGS. 1 to 3 during loading with loose cargo.
Figure 5A:
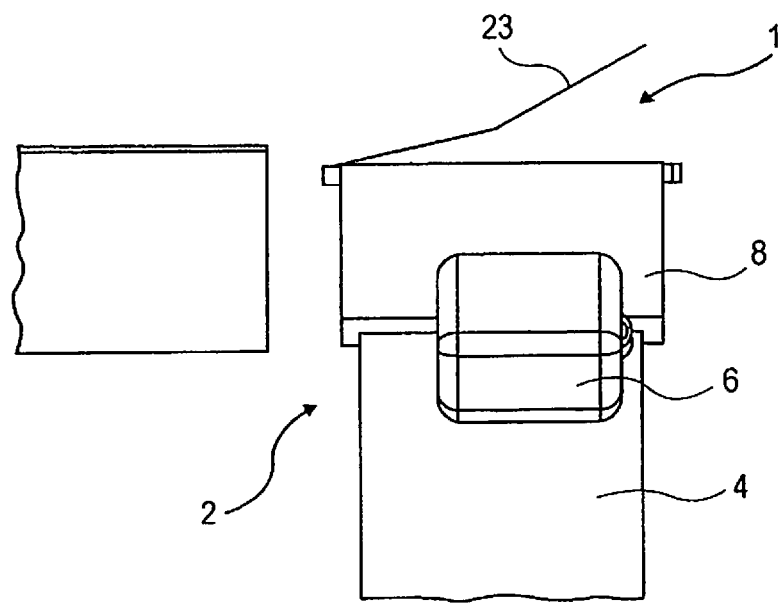

In FIG. 5 visualizes in a schematically simplified sectional view and in a schematically simplified top view a generalized representation of the intermediate conveyor means 2 shown in FIGS. 1 to 3 during loading with loose cargo 6. Loose cargo 6 is handed over from the first conveyor organ 8 of the intermediate conveyor means 2 to the second conveyor organ 10, which latter comprises a panel 23 that may be raised at one end, so that the loose cargo 6 may slide, like along an inclined plane, off the panel 23—to the left in the representation shown at the bottom of FIG. 5—onto the transport means 14.

In FIGS. 1 to 5, the loading operation shown there is carried out without a collecting tray being arranged in the closer surroundings of the cargo hold opening (not shown). This collecting tray is in German usage frequently referred to as a "Door-Way-Unit" (in brief: DWU). A variant of such a collecting tray is shown in FIGS. 6 to 9 and FIGS. 13 to 16 and there designated by reference numeral 24.

Figure 6:
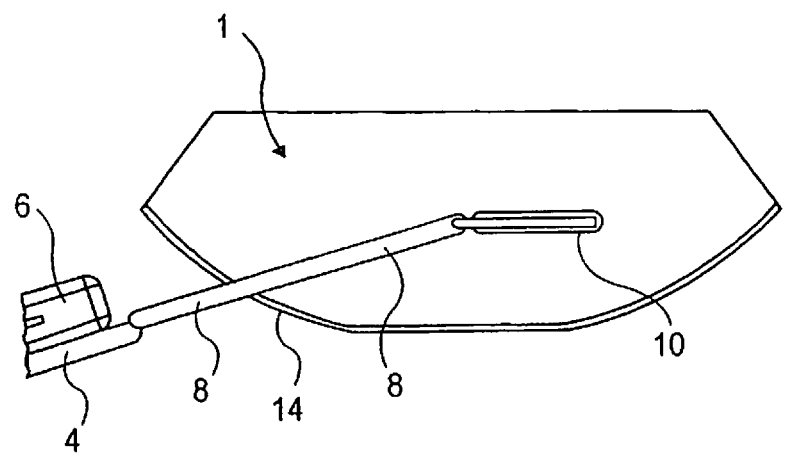
FIGS. 6 and 6A show a schematically simplified sectional view and a schematically simplified top view of intermediate conveyor means as shown in FIGS. 1 to 3 during loading with a collecting tray (in brief: DWU) arranged underneath.
Figure 6A:
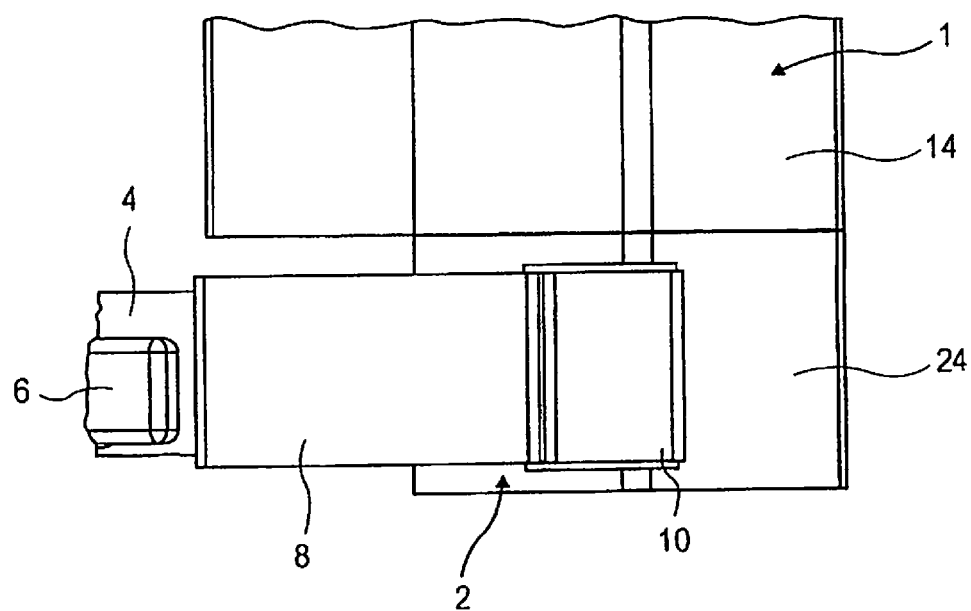

FIG. 6 visualizes in a schematically simplified sectional view and in a schematically simplified top view the intermediate conveyor means 2 already shown in FIG. 3 during loading, with a collecting tray (in brief: DWU) arranged underneath 24. The DWU 24 is located adjacent the transport means 14 and secures the space in the neighboring range of the cargo hold opening (not shown) under the intermediate conveyor means 2, so that loose cargo 6 possibly sliding off the intermediate conveyor means 2 is caught and handed over to the transport means 14.

Figure 7:
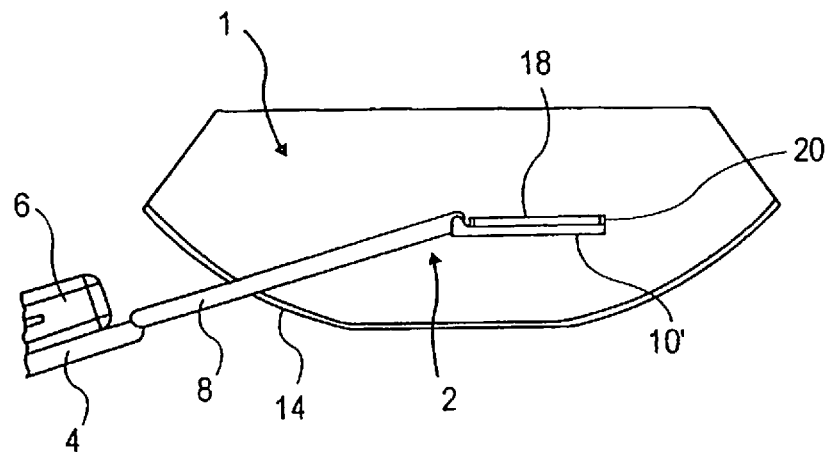
FIGS. 7 and 7A show a schematically simplified sectional view and a schematically simplified top view of the second variant of intermediate conveyor means as shown in FIG. 2 and FIG. 2A during loading with a collecting tray (in brief: DWU) arranged underneath.
Figure 7A:
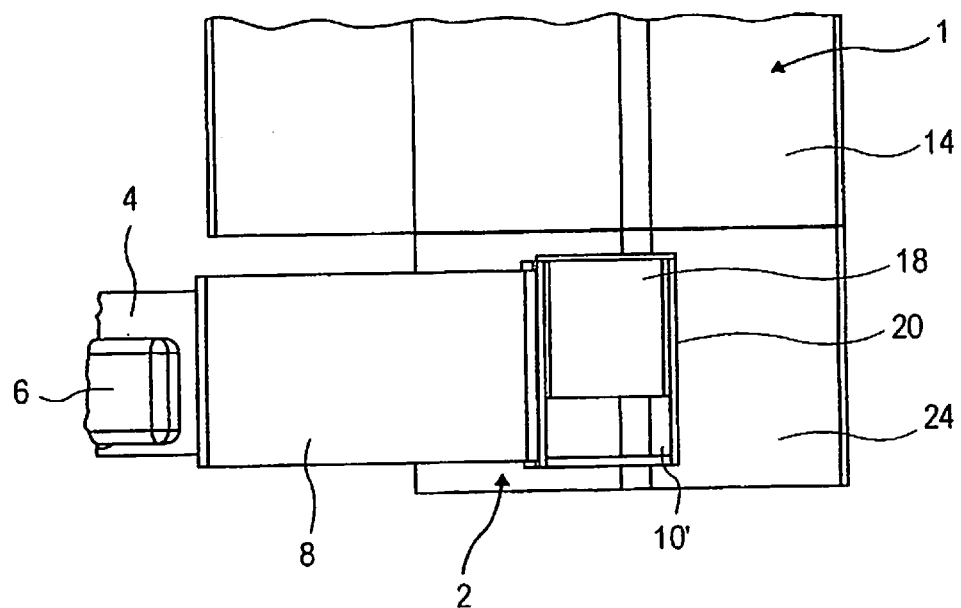

FIG. 7 represents in a schematically simplified sectional view and in a schematically simplified top view the second variant of intermediate conveyor means 2 already shown in FIG. 2 with the variant of the second conveyor organ 10' already represented there during loading, with a collecting tray 24 arranged underneath.

As was already mentioned above, parts or elements of the furthermore discussed variants having similar effects shall in the following be designated by like reference numerals as in the preceding figures.

Figure 8:
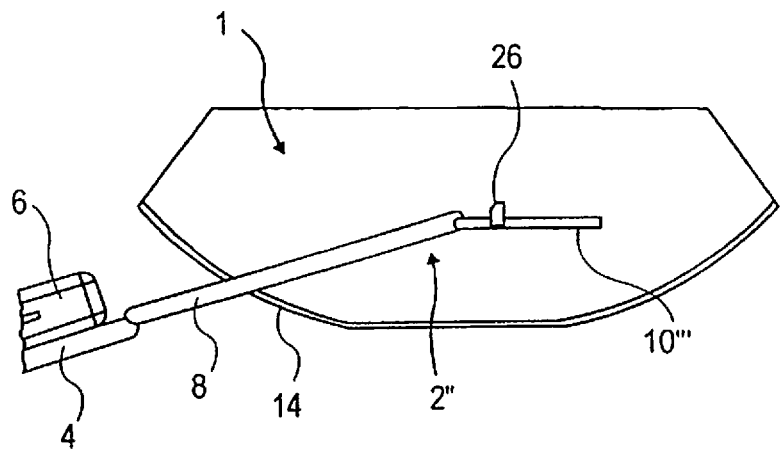
FIGS. 8 and 8A show a schematically simplified sectional view and a schematically simplified top view of a third variant of intermediate conveyor means during loading with a collecting tray (in brief: DWU) arranged underneath.
Figure 8A:
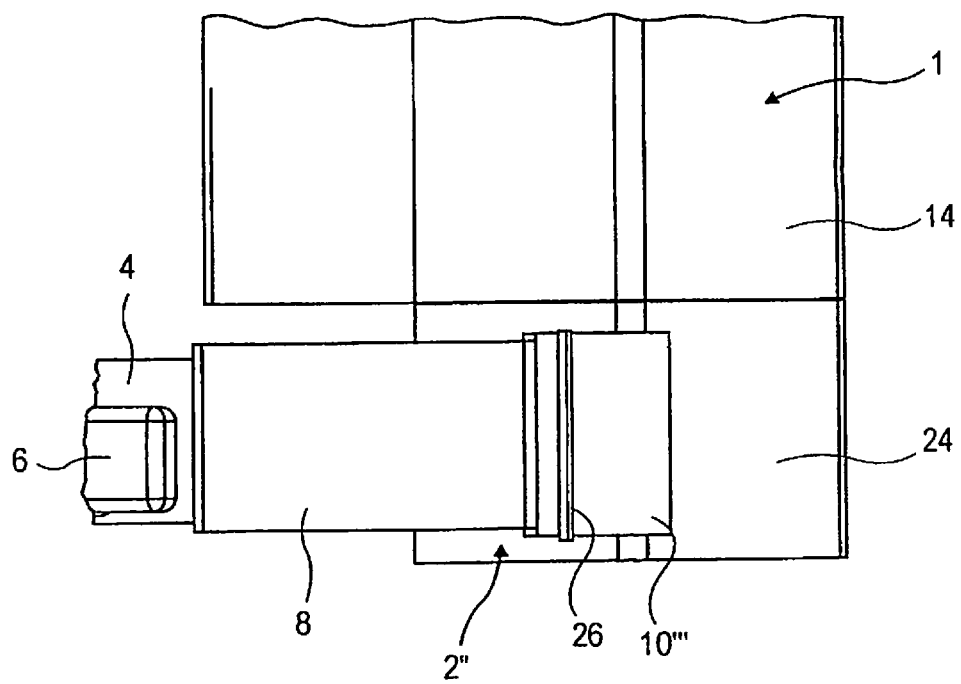

FIG. 8 shows in a schematically simplified sectional view and in a schematically simplified top view a fourth variant of intermediate conveyor means 2" during loading with a DWU 24 arranged underneath, wherein the intermediate conveyor means 2" comprise another variant of the second conveyor organ 10''' with a pushing organ 26 formed in the longitudinal direction.

Figure 9:
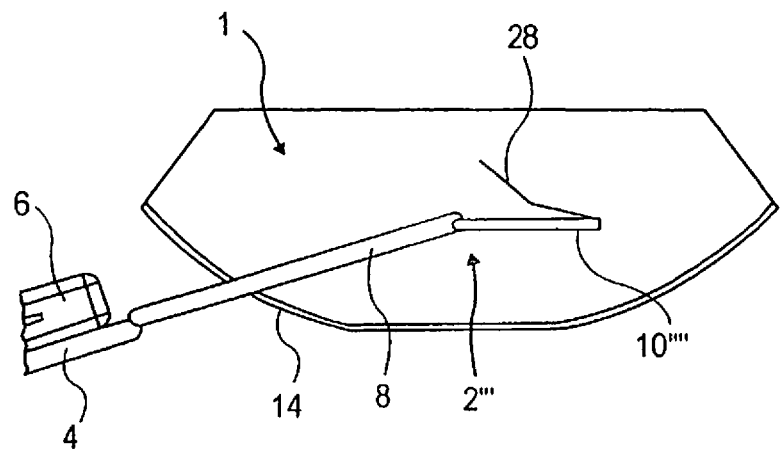
FIGS. 9 and 9A show a schematically simplified sectional view and a schematically simplified top view of a fourth variant of intermediate conveyor means during loading with a collecting tray (in brief: DWU) arranged underneath.
Figure 9A:
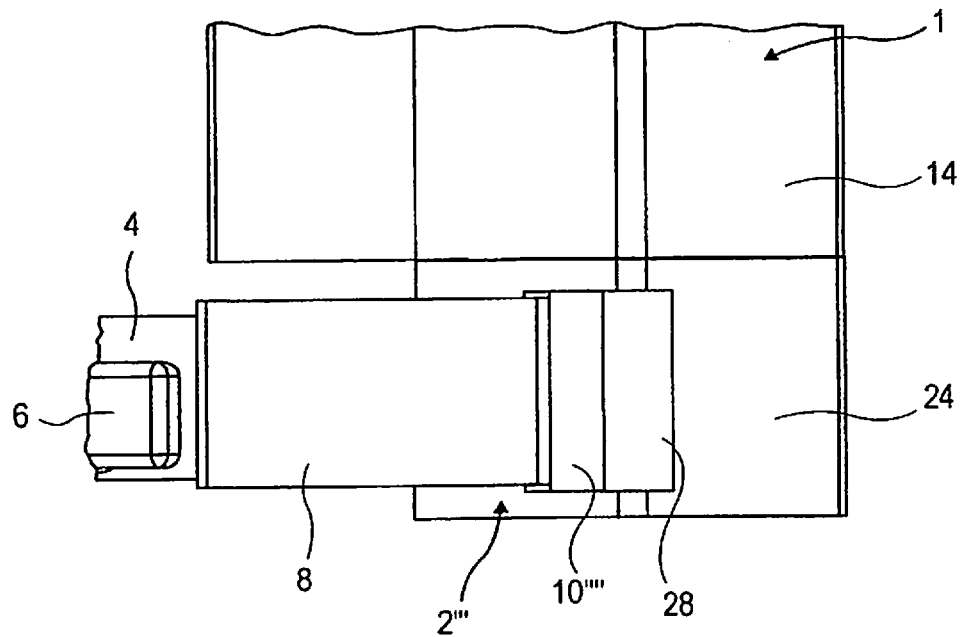

FIG. 9 shows in a schematically simplified sectional view and in a schematically simplified top view a fourth variant of intermediate conveyor means 2''' during loading with a collecting tray 24 arranged underneath. The further variant of the intermediate conveyor means 2''' comprises another variant of the second conveyor organ 10'''' which includes an inclined plane 28 adapted to be unfolded.

Figure 10:
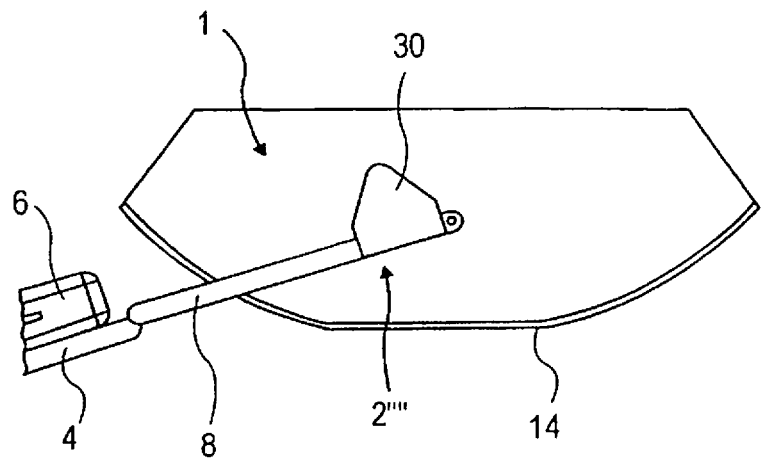
FIGS. 10 and 10A show a schematically simplified sectional view and a schematically simplified top view of a fifth variant of intermediate conveyor means during unloading without a collecting tray (in brief: DWU) arranged underneath.
Figure 10A:
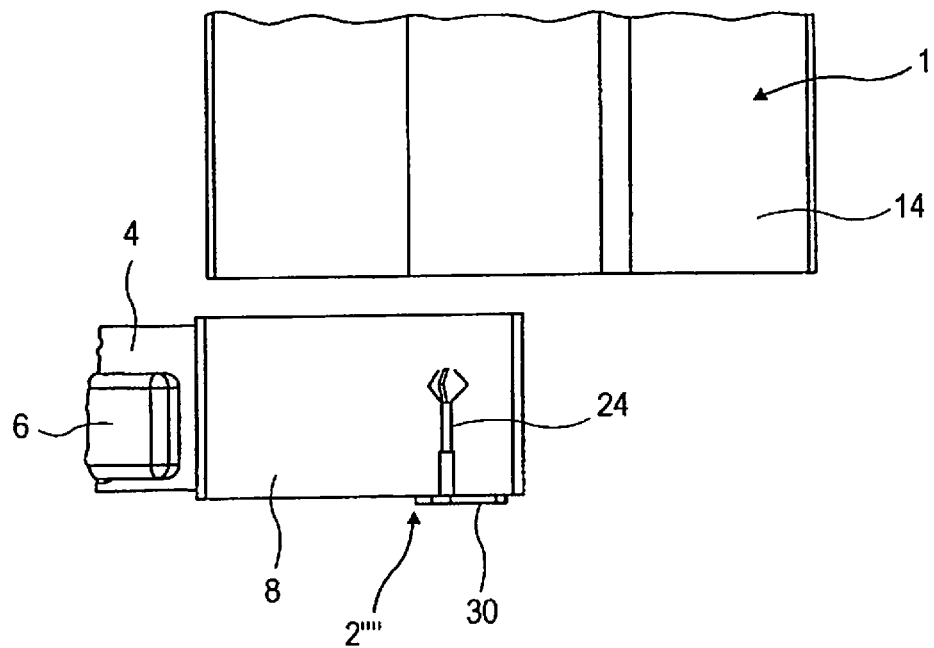
Figure 11:
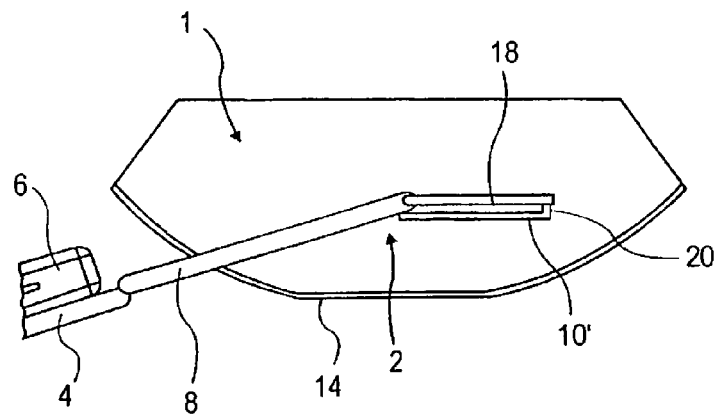
FIGS. 11 and 11A show a schematically simplified sectional view and a schematically simplified top view of the second variant of FIG. 2 and FIG. 2A of intermediate conveyor means as shown in FIG. 1 and FIG. 1A during unloading, without a collecting tray (in brief: DWU) arranged underneath.
Figure 11A:
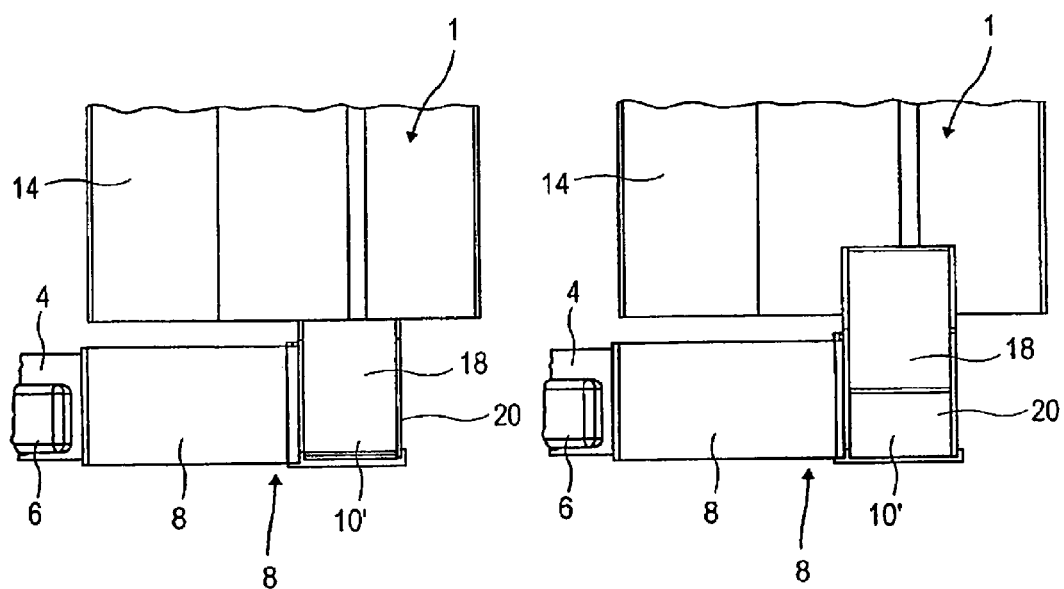
Figure 12:
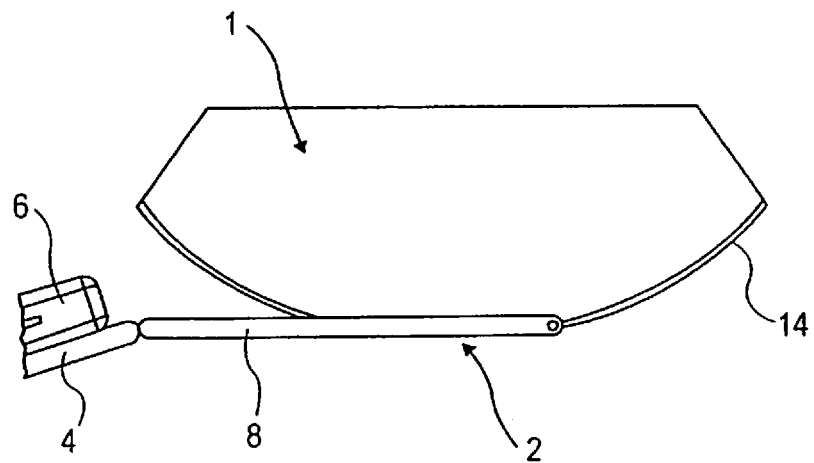
FIGS. 12 and 12A show a schematically simplified sectional view and a schematically simplified top view of a simplified variant of intermediate conveyor means without second conveyor organ during unloading, without a collecting tray (in brief: DWU) arranged underneath.
Figure 12A:
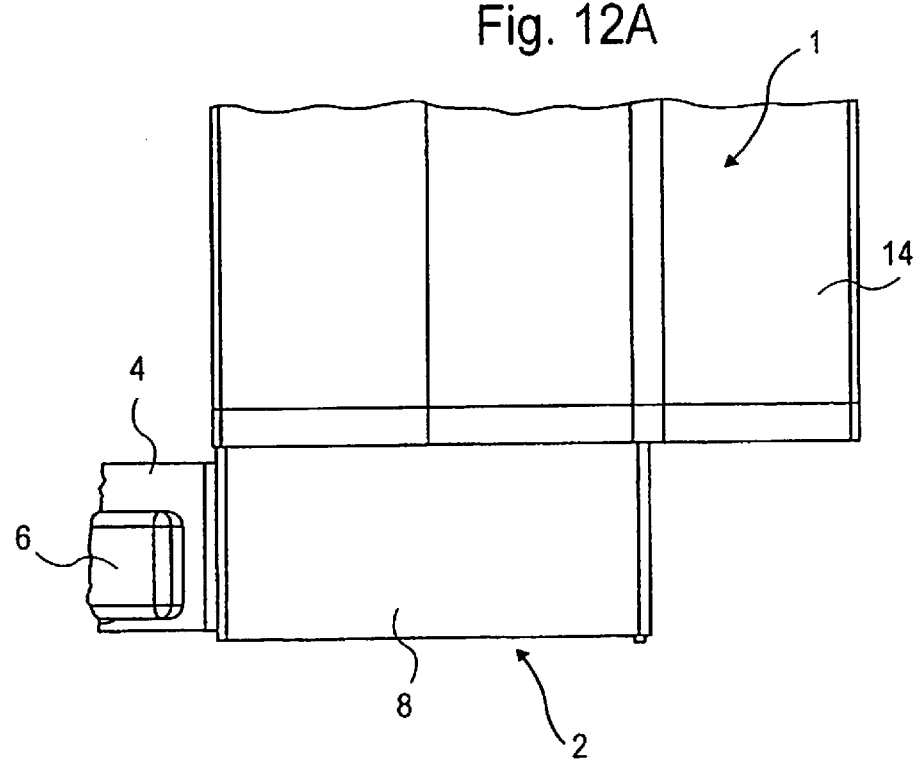

The unloading operations visualized in FIGS. 10 to 12 are represented without a collecting tray (in brief: DWU).

FIG. 10 represents in a schematically simplified sectional view and in a schematically simplified top view a fifth variant of intermediate conveyor means 2"" during unloading without a DWU arranged underneath. This variant of the intermediate conveyor means 2"" merely comprises a first conveyor organ 8, to whose end portion reaching into the cargo hold 1 the gripping organ 32 mounted on a supporting element 30 is linked. The gripping organ 32 grasps loose cargo supplied on the transport means 14 and pulls it onto the first conveyor organ 8.

FIG. 11 shows in a schematically simplified sectional view and in a schematically simplified top view the second variant as shown in FIG. 2 of intermediate conveyor means 2 with the second conveyor organ 10' shown in FIG. 1 during loading; here, however, during unloading and without a DWU arranged underneath. The second conveyor organ 10' comprises a conveyor belt running across a rigid slide panel 18 arranged underneath, wherein the panel 18 with the conveyor belt may be inserted between two cargo items 6, and the upper loose cargo may be transported off by means of the conveyor belt. For unloading, the panel 18 stabs, in the manner of a spatula, in a longitudinal direction into cargo items stacked at the front end of the transport means 14, pulls a loose cargo onto itself by means of the conveyor belt, carries it away in the backward movement of the conveyor belt, to then hand it over to the first conveyor organ 8, so that it may be transported from there to the tarmac conveyor organ 4 for further unloading.

FIG. 12 represents in a schematically simplified sectional view and in a schematically simplified top view a simplified variant of intermediate conveyor means 2 without a second conveyor organ during unloading, without a DWU arranged underneath. The first conveyor organ 8 is set to the height of the cargo hold floor of the cargo hold 1 and directly receives loose cargo supplied by the transport means 14, to transport it transversely to the longitudinal axis of the plane from the cargo hold 1 out through the cargo hold opening (not shown), and hand it over to the tarmac conveyor organ 4 for further unloading.

By means of the intermediate conveyor means 2 lowered onto the floor of the cargo hold, with intermediate conveying of the loose cargo by the transport means 14 to the intermediate conveyor means 2 set to "unloading", it is possible to achieve a particularly simple form of the unloading operation, wherein the loose cargo reaches the front edge and automatically transits, or drops, from the transport means 14 to the intermediate conveyor means 2, to be conveyed off by the latter in the direction of the cargo hold opening.

Figure 13:
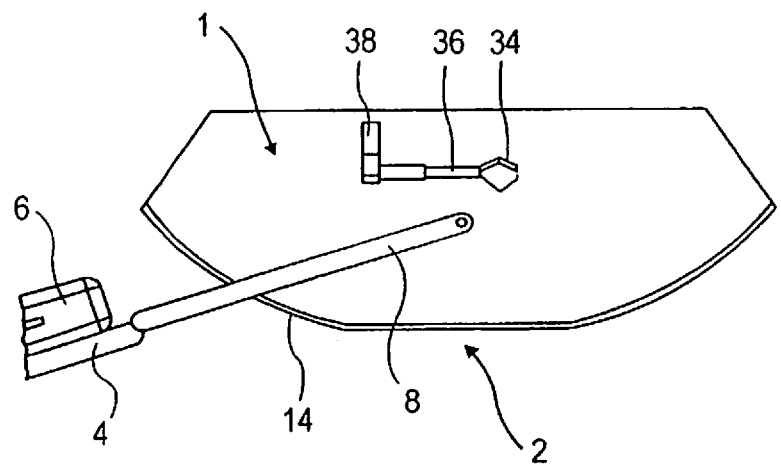
FIGS. 13 and 13A show a schematically simplified sectional view and a schematically simplified top view of the simplified variant of intermediate conveyor means as shown in FIG. 12 and FIG. 12A during unloading with a separate gripping organ and with a collecting tray (in brief: DWU) arranged underneath.
Figure 13A:
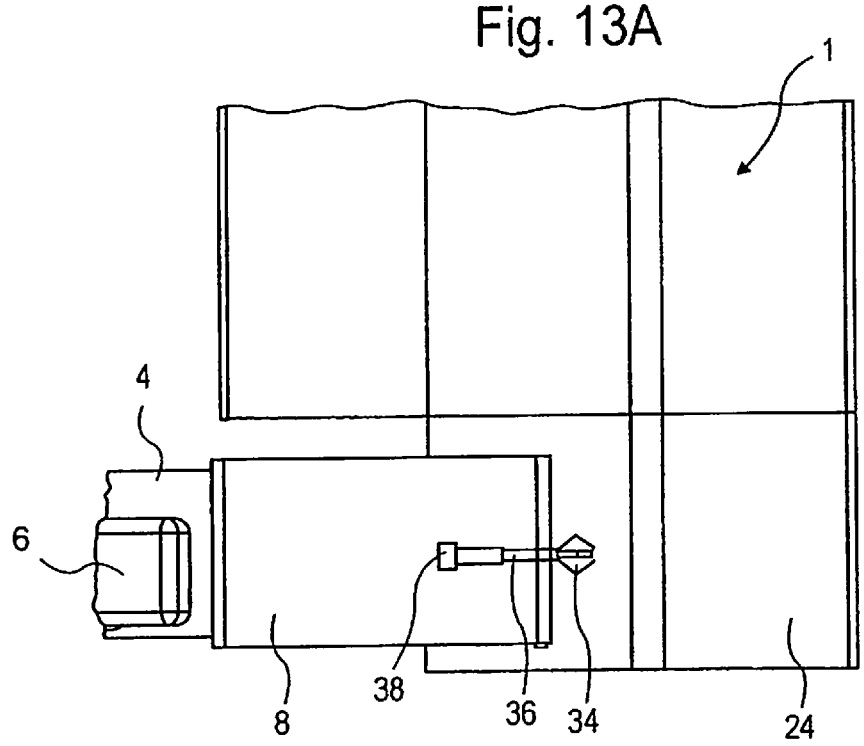

FIG. 13 represents in a schematically simplified sectional view and in a schematically simplified top view the variant of intermediate conveyor means 2, simplified in FIG. 12, during unloading, with a separate gripping organ 34, and with a collecting tray arranged underneath 24. The separate gripping organ 34 is connected with the structure (not shown) of the cargo hold 1 through a telescope-type arm 36 via a corresponding linkage 38. The gripping organ 34 fetches loose cargo from the front end of the transport means 14 and pulls it onto the first conveyor organ 8 of the intermediate conveyor means 2. Just the same, the gripping organ 34 may grasp loose cargo pushed out by the transport means 14 onto the collecting tray 24 and pull it onto the first conveyor organ 8 of the intermediate conveyor means 2, from where it may be handed over to the tarmac conveyor organ 4 for unloading.

Figure 14:
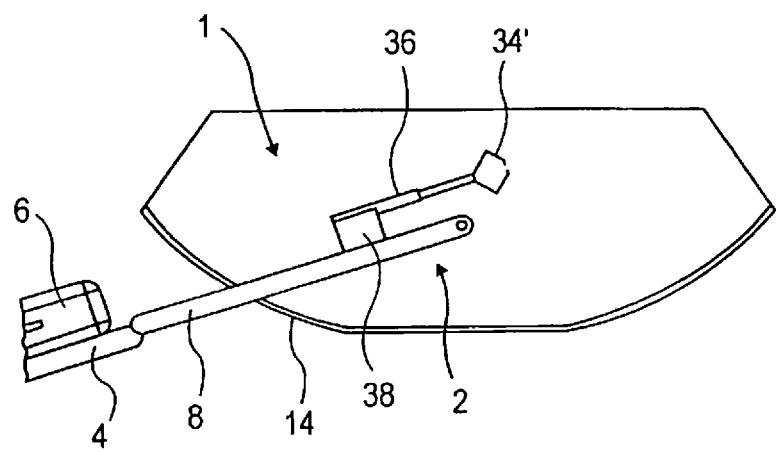
FIGS. 14 and 14A show a schematically simplified sectional view and a schematically simplified top view of the simplified variant of intermediate conveyor means as show in FIG. 12 and FIG. 12A during unloading with an integrated gripping organ and with a collecting tray (in brief: DWU) arranged underneath.
Figure 14A:
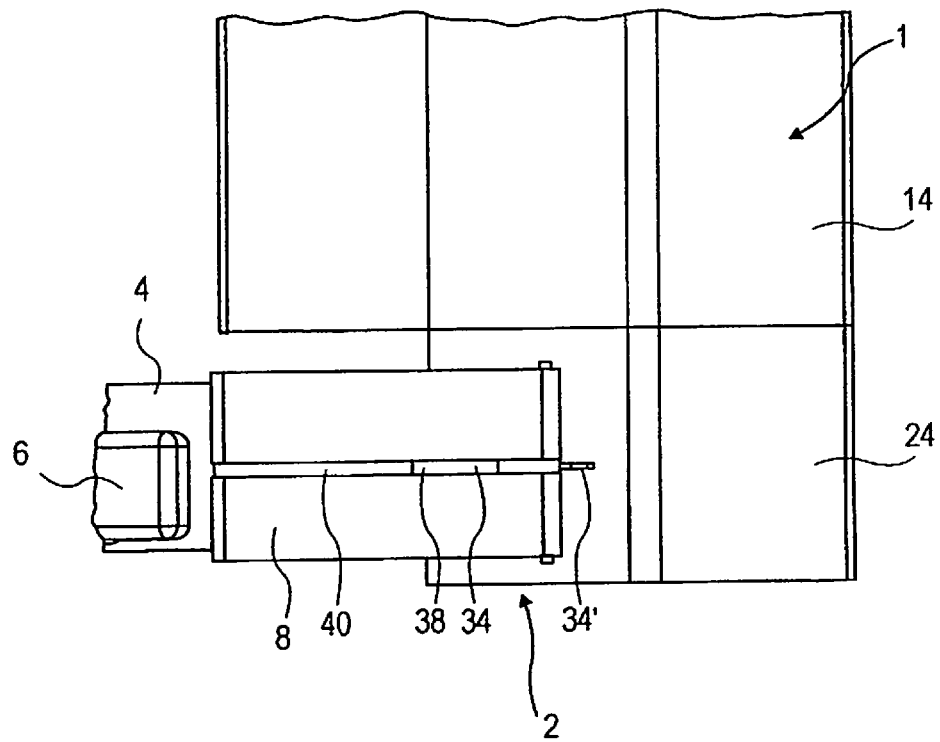

FIG. 14 represents in a schematically simplified sectional view and in a schematically simplified top view the simplified variant of intermediate conveyor means 2 shown in FIG. 2 during unloading with an integrated gripping organ 34' and with a DWU 24 arranged underneath. The integrated gripping organ 34' is connected with the first conveyor organ 8 of the intermediate conveyor means 2 through a telescope-type arm 36 and through the intermediary of a linkage or of a shoulder 38 with the aid of a guide rail 40 arranged thereon. The operation of the gripping organ 34 is the same as above discussed operation of the separate gripping organs 34 represented FIG. 13, that is linked to the structure of the plane. In the embodiment represented in FIG. 14, the first conveyor organ 8 includes, e.g., two parallel conveyor belts, between which the gripping organ 34 may be lowered so that loose cargo 6 may be transported by the conveyor belts beyond the lowered gripping organ 34.

Figure 15:
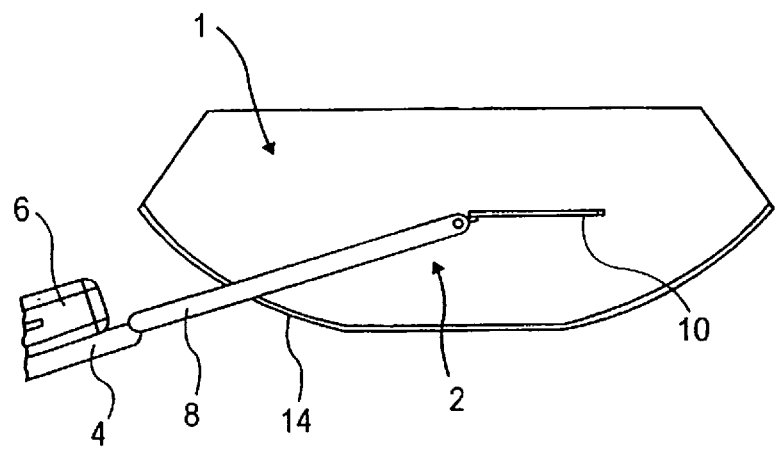
FIGS. 15 and 15A show a schematically simplified sectional view and a schematically simplified top view of a sixth variant of intermediate conveyor means during unloading with a collecting tray (in brief: DWU) arranged underneath.
Figure 15A:
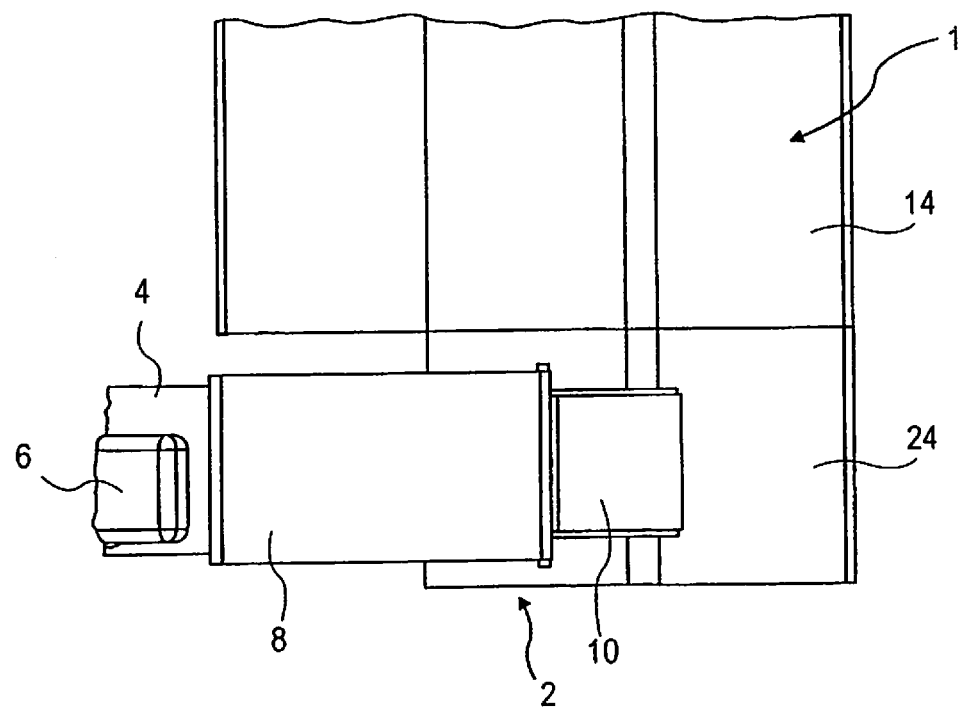

FIG. 15 shows in a schematically simplified sectional view and in a schematically simplified top view another variant of intermediate conveyor means 2 during unloading with a collecting tray 24 arranged underneath. This further variant of the intermediate conveyor means 2 comprises a second conveyor organ 10 having the form of a thin panel. The panel 10 is mounted in the longitudinal direction thereof in parallel to the longitudinal direction of the plane so as to be displaceable relative to the front side of the first conveyor organ 8, and is shown here in a central position. The slide panel 10 may be introduced between two cargo items together with a conveyor belt arranged or sliding on it, so that owing to the conveying movement of the conveyor belt, the top loose cargo may be picked up and transported off by the conveyor belt.

Figure 16:
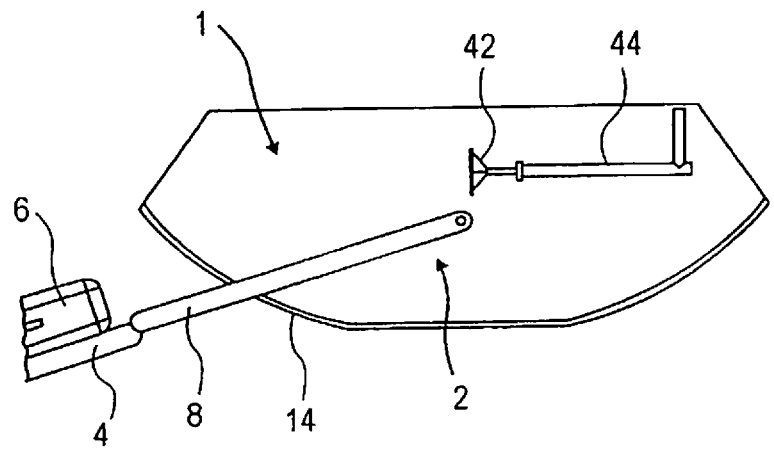
FIGS. 16 and 16A show a schematically simplified sectional view and a schematically simplified top view of the simplified variant of intermediate conveyor means as shown in FIG. 12 and FIG. 12A during unloading with a separate sliding organ and with a collecting tray (in brief: DWU) arranged underneath.
Figure 16A:
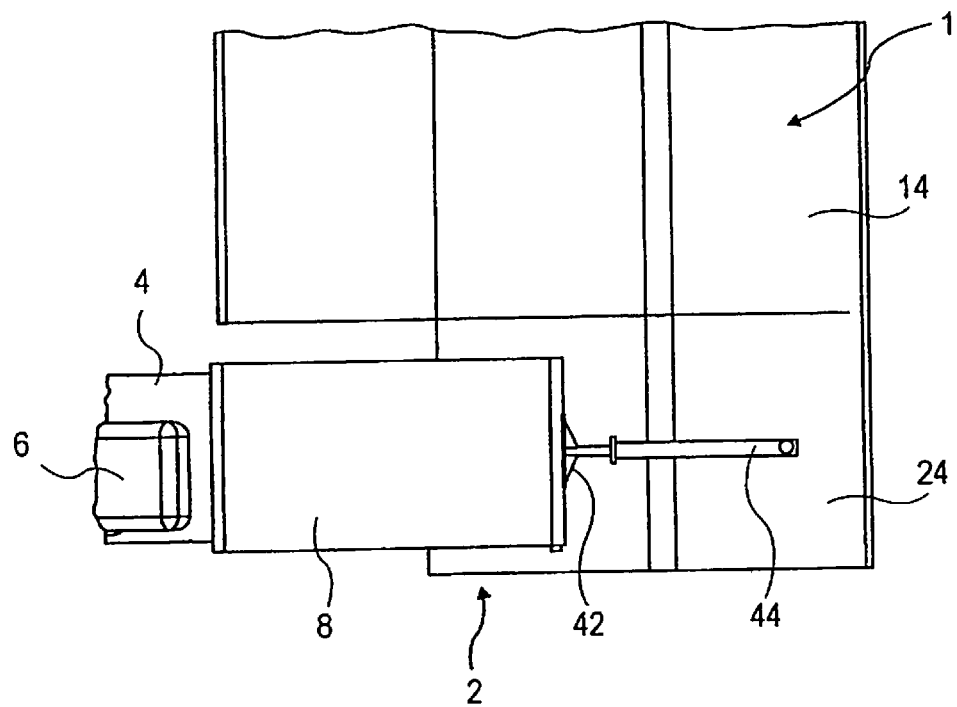

FIG. 16, finally, represents in a schematically simplified sectional view and in a schematically simplified top view a simplified variant of intermediate conveyor means 2 as already shown in FIG. 12, but now during unloading with a collecting tray arranged underneath 24 and moreover with a separate sliding organ 42. The separate sliding organ 42 is connected to the structure (not shown) of the cargo hold 1 through a linkage 44. The sliding organ 42 pushes loose cargo, supplied by the transport means 14 from the cargo hold 1 for unloading, onto the first conveyor organ 8 of the intermediate conveyor means 2, so that it may be conveyed outside by the latter. The sliding organ 42 may equally push loose cargo from the collecting tray 24 or DWU onto the conveyor organ 8.

FIGS. 17 to 21 represent another variant of the system of the invention and of the intermediate conveyor means in accordance with the invention in a schematically simplified manner. Identical parts or parts having identical effects are designated by like reference numerals in order to simplify discussion.

FIG. 17 shows in a schematically simplified lateral view another variant of the system of the invention for loading and unloading loose cargo in a cargo hold 100 of a plane during loading. As is particularly well visible in FIG. 20 or 21, the area of the floor of the cargo hold 100 is covered by transport means 102 which may preferably have the form of a transport carpet. This transport carpet 102 serves for—particularly intermittent—conveying of loose cargo towards the inner end of the cargo hold 100 during loading, or away from it during unloading. The front end of the transport means 102 reaches into the range of the cargo hold opening 104 in the fuselage. Laterally of the plane, for example, a mobile handling machine 106 comprising a conveyor organ 108 is stationed for transporting loose cargo between the level of the tarmac 110 and the cargo hold opening 104. Between the plane-side end of the external conveyor organ 108 and the front end of the transport means 102 in the cargo hold 100 an intermediate conveyor means 112 forms a kind of bridge whereby the distance between the plane-side end of the external conveyor organ 108 and the front end of the transport means 102 may be bridged. By means of the intermediate conveyor means 112, loose cargo is initially conveyed further into the fuselage substantially transversely to the longitudinal axis of the plane during loading. Thereupon the loose cargo may be rotated manually in the cargo hold 100 and conveyed further substantially in the longitudinal direction of the plane, so that it may be deposited at the front end of the transport means 102 in the cargo hold 100. During unloading, loose cargo conveyed by the intermediate conveyor means 112 beyond the front end of the transport means 102 into the plane of the cargo hold opening 104 may be transported off substantially transversely to the longitudinal axis of the plane through the cargo hold opening 104.

In the case of the plane shown in a schematically simplified representation, the cargo hold hatch 114 is opened by upwardly pivoting it to the inside.

Figure 19:
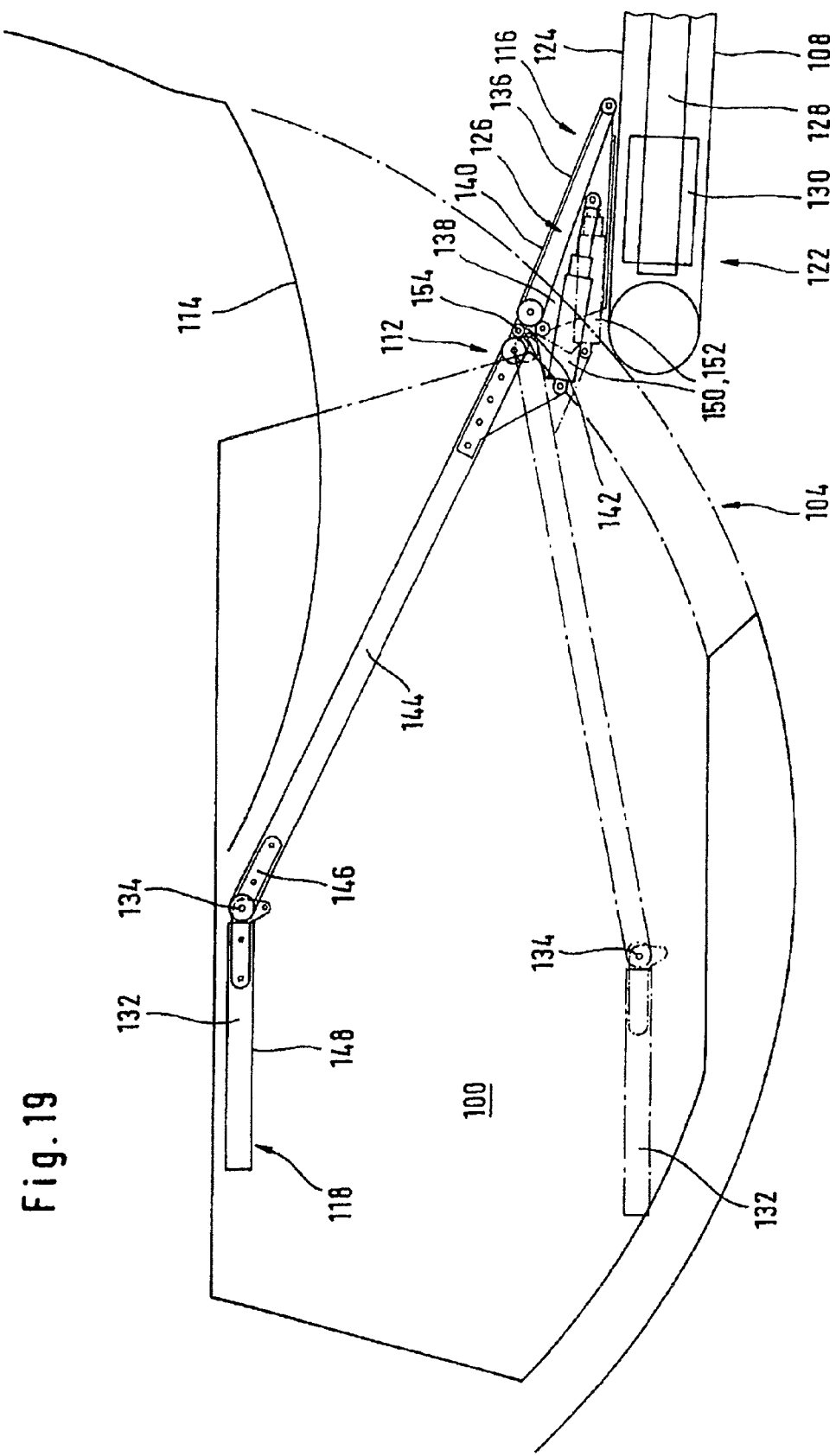
FIG. 19 shows a schematically simplified enlarged lateral view of the variant as shown in FIGS. 17 and 18.

As is well visible in FIGS. 17 to 19, the plane-side end of the external conveyor organ 108 reaches as far as the range of the cargo hold opening 104, however not into it, so that during positioning the mobile handling machine 106 there is no risk of damage to the cargo hold opening 104.

With the aid of the system of the invention and also of the intermediate conveyor means 112 in accordance with the invention, loose cargo may purposely be deposited on the transport means 102 in the cargo hold 100 during loading, and purposely be transported off from there during unloading.

Figure 20:
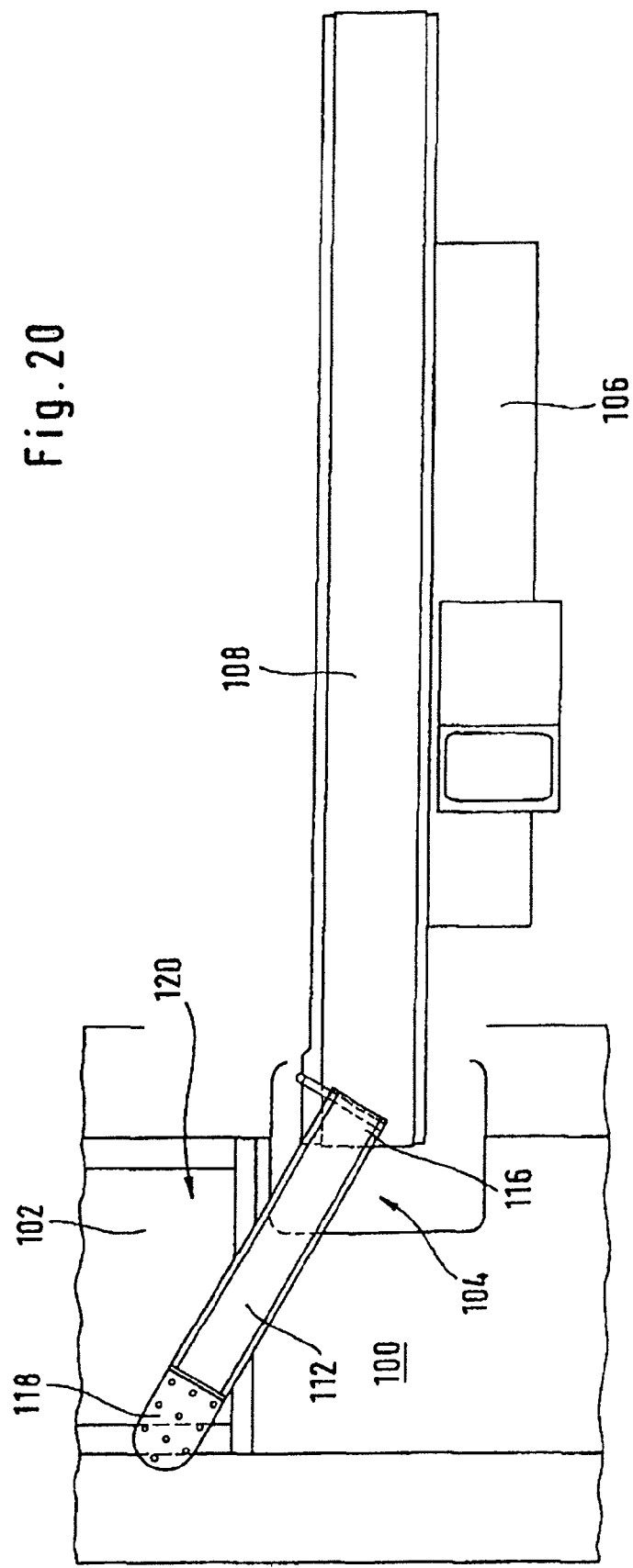
FIG. 20 shows a schematically simplified top view of the variant as shown in FIGS. 17 to 19.
Figure 21:
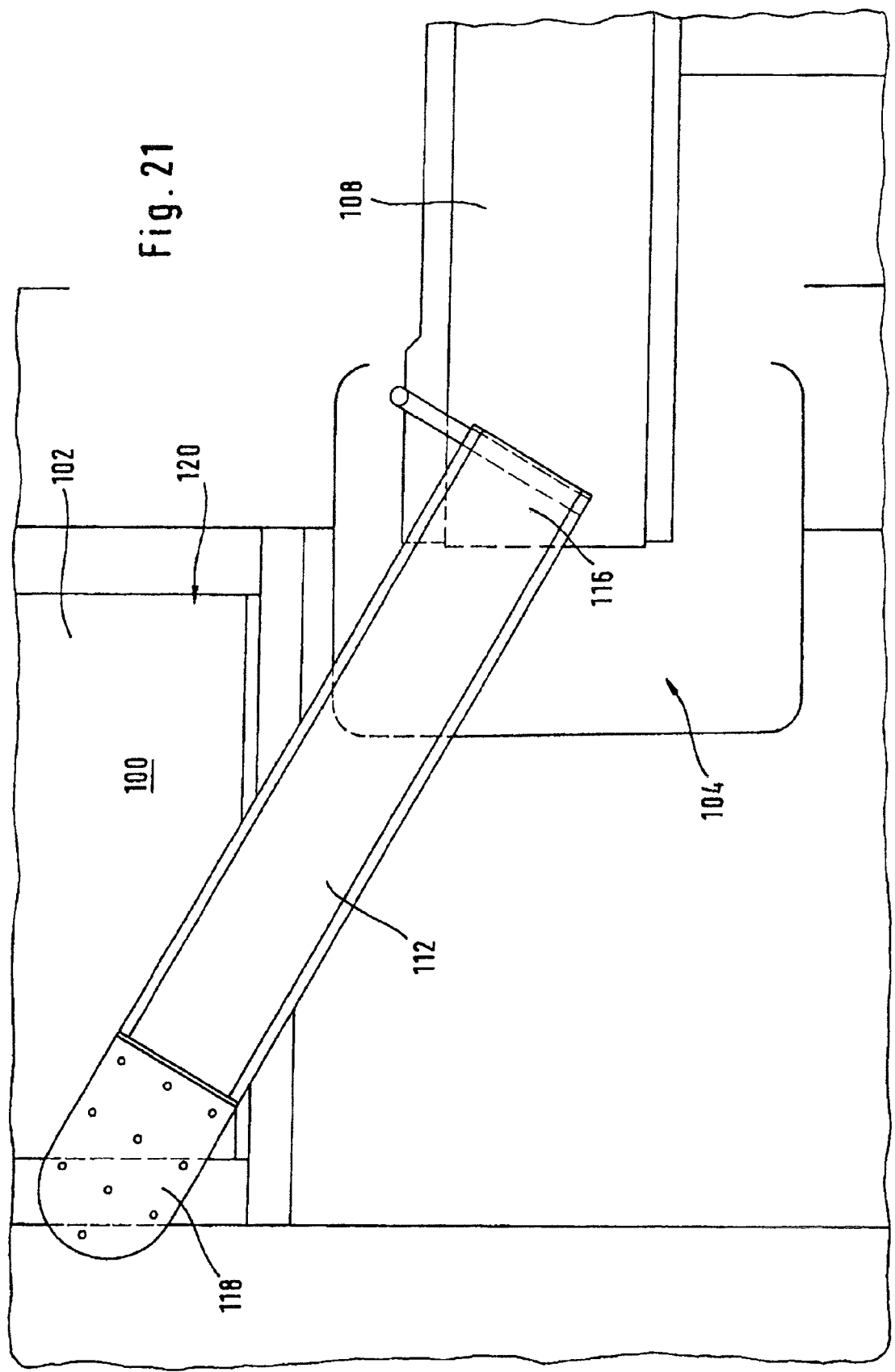
FIG. 21 shows a schematically simplified enlarged partial top view of the variant as shown in FIGS. 17 to 20.

The intermediate conveyor means 112 may be moved back and forth both in the conveying direction of the external ground-supported conveyor organ 108 and pivoted relative to the latter about an angle of about −30° to +30°, so that the beginning 116 of the intermediate conveyor means 112 facing the external conveyor organ 108 always overlaps with the external conveyor organ 108, and the inner end 118 of the intermediate conveyor means 112 located inside the cargo hold 100 always overlaps with the end range 120 of the transport means 102 facing the cargo hold opening 104, as is visualized in FIGS. 20 and 21.

The intermediate conveyor means 112 comprises at its lower side in the overlap range 122 with the external conveyor organ 108 a sliding element (not shown), which exemplarily may have the form of a wheel or coaster. This sliding element serves slidably supporting the intermediate conveyor means 112 on the upper side 124 of the external conveyor organ 108 in the end range thereof.

The intermediate conveyor means 112 comprises in the overlap range 122 with the external conveyor organ 108 an outrigger 126 that is linked between the conveyor device 112. The end of the outrigger 126 facing away from the intermediate conveyor means 108 is supported against a sliding rail 128 by an articulation (not shown) linked there. The sliding rail 128 is oriented in parallel with the longitudinal direction of the external conveyor organ 108 and attached to the latter. The sliding rail 128 serves as a slidable support for the intermediate conveyor means 112 in the conveying direction of the external conveyor organ 108. To this end, in the variant represented in FIG. 19 a slidable carriage 130 is provided and connected with the articulation of the outrigger 126 through elements not shown here.

As is particularly visualized in FIGS. 17 to 19, the one end 108 of the intermediate conveyor means 112 facing the front end 120 of the transport means 102 in the cargo hold 100 is adjustable in height, namely, relative to the beginning 116 of the intermediate conveyor means 112 facing the external conveyor organ 108. Here it is visible particularly in FIG. 19 that an end portion 132 of the intermediate conveyor means 112 may be pivoted about an axis 134 transversely to the direction of the intermediate conveyor means 112, that this end portion 132 may be oriented horizontally. A leading portion 136 of the intermediate conveyor means 112 is oriented at a predetermined angle of inclination of, e.g., between 10° to 30°, with the angle of inclination of the external conveyor organ 108.

The intermediate conveyor means 112 with its conveying direction for conveying loose cargo may be pivoted substantially transversely to the longitudinal axis of the plane, in the angular range of about −30° to +30° relative to the conveying direction of the external conveyor organ 108.

The supporting structure of the intermediate conveyor means 112 is manufactured of lightweight materials such as aluminum or fiber composites.

As is moreover visible particularly in FIG. 19, the intermediate conveyor means 112 comprises a first frame 138 supported against the external conveyor organ 108. The frame 138 carries a first conveyor organ 140 which may, e.g., have the form of a conveyor belt. During loading, this first conveyor organ 140 receives loose cargo for example in the range of the cargo hold opening 104 from the end 122 of the external conveyor organ facing the plane and conveys it on substantially transversely to the longitudinal axis of the plane, where the expression of substantially transversely to the longitudinal axis of the plane is to be understood as the above discussed range of directional tolerance of −30° to +30°. To the end 142 of the first conveyor organ 140 a second conveyor organ 144 is connected, which may be a conveyor belt, for example. This second conveyor organ 144 serves for bridging the distance from the end 122 of the external conveyor organ 108 to inside the cargo hold 100. During loading, the second conveyor organ 144 receives loose cargo, e.g., in the range of the cargo hold opening 104 of the plane from the end 142 of the first conveyor organ 140 and conveys it deeper into the fuselage substantially transversely to the longitudinal axis of the plane. The end 146 of the second conveyor organ 144 is followed by a third conveyor organ 148 preferably having the form of a roller panel. During loading, the third conveyor organ 148 having the form of a roller panel receives loose cargo form the end 146 of the second conveyor organ 144 and permits a manual rotation of the loose cargo rotatably placed on the third conveyor organ 148, such that the loose cargo may be conveyed further substantially in the longitudinal direction of the plane to the front end 120 of transport means 102 present in the cargo hold 100.

During unloading, loose cargo is accordingly received from the front end 120 of the transport means 102 present in the cargo hold 100 to the third conveyor organ 148, such that it may be applied on the third conveyor organ 148 by a person working in this range without a substantial effort, where it is placed rotatably so that it may optionally be rotated by hand and is supported such as to be suitable for handing over to the second conveyor organ 144. The second conveyor organ 144 conveys loose cargo substantially transversely to the longitudinal axis of the plane to the cargo hold opening 104 and/or through the latter and hands the loose cargo over to the first conveyor organ 140, which further conveys the loose cargo substantially transversely to the longitudinal axis of the plane to the external conveyor organ 108 and hands it over to the latter for further conveying. A sliding element (not shown) which may, e.g., have the form of a wheel or coaster, is linked to the frame 138 of the first conveyor organ 140. Furthermore there is linked to the frame 138 of the first conveyor organ 140 an outrigger that may, e.g., have the form of an outrigger having two arms. The two arms 150 and 152 may have the form of telescope arms so as to be modifiable in length, so that the geometry of a triangle formed about the two arms having the articulation (not shown) is variable. In this way, the intermediate conveyor means 112 may on the one hand be linked to the external conveyor organ 108 in a particularly stable manner and free of vibrations, and at the same time may on the other hand be held pivotable relative to the latter.

The second conveyor organ is linked to the frame 138 of the first conveyor organ 140 such a to be pivotable about an axis 154 transverse to the conveying direction, e.g., by an angular range of −15° to +45° relative to the horizontal, for modifying the height of the end 146 of the second conveyor organ 144 relative to the beginning thereof. Depending on need and orientation of the outermost conveyor organ 108, a pivoting capability of the second conveyor organ 144 about an angular range of about −30° to +30° may be sensible. The third conveyor organ 148 is pivotable about an axis 134 relative to the second conveyor organ 144, so that in operation the intermediate conveyor means 112 may be oriented horizontally. The second and/or third conveyor organ is here associated with elements supporting its lifting, lowering, or pivoting movements, such as, e.g., a parallelogram linkage arranged on either side of the edges of the second conveyor organ 144 for supporting a lifting, lowering, or pivoting movements, so that the like movements may be predetermined freely by a person working in the cargo hold 100 nearly free without any force.

The intermediate conveyor means 112 moreover includes a multi-function operating element not shown here. The multi-function operating element is arranged in the range of the third conveyor organ 148 and may have the form of a multi-function lever. By means of the multi-function operating element it is possible, for example, to control the horizontal orientation of the third conveyor organ 148, the inclination of the second conveyor organ 144, the position of the first conveyor organ 140 on the external conveyor organ 108, the conveying direction, the conveying velocity, or further functions.

By means of the coaster (not shown) for supporting the intermediate conveyor means 112 on the external conveyor organ 108, in operation a small gap of about 5-10 mm is kept between the conveyor belts of the first conveyor organ 140 of the intermediate conveyor means 112 and the external conveyor organ 108, so that these closely adjacent conveyor belts are as close to each other as possible, however do not rub against each other. Thus an optimum transition of loose cargo from the conveyor belt of the outermost conveyor organ 108 to the conveyor belt of the first conveyor organ 140 of the intermediate conveyor means 112 is ensured.

The articulation (not shown) whereby the outrigger 138 is linked to the sliding rail 128 via the sliding carriage 130, ensures both a sufficiently sturdy support of the entire intermediate conveyor means 112, in addition to loose cargo located thereon during operation, against the external conveyor organ 108 located in the overlap range 122 underneath the frame 138. The articulation is capable of admitting translatory as well as rotating movements.

The drive mechanism for the conveyor organs of the intermediate conveyor means may, for example, be electrical motor operators. Hydraulic or pneumatic drive mechanisms are, however, also conceivable. It is equally conceivable for the support elements supporting the lifting, lowering, or pivoting movements of the three conveyor organs of the intermediate conveyor means 112 to have the form of active elements, such as hydraulic cylinders, pneumatic cylinders or electric motor operators.

The length of the intermediate conveyor means in a preferred embodiment is about 1.50 m at a width of about 0.40 m. The total weight of the intermediate conveyor means is less than 100 kg. Owing to the resulting low mass forces, easy motility of the intermediate conveyor means 112 in any operating condition is ensured. At the same time, the risk of damage to the structure of the plane particularly in the cargo hold 100 upon inadvertent contact of one end of the intermediate conveyor means 112 with the structure of the plane is negligible due to the low mass forces. As a further protection against damage and/or injury, the edges or corners of the intermediate conveyor means 112 are lined with correspondingly soft material.

Figure 22:
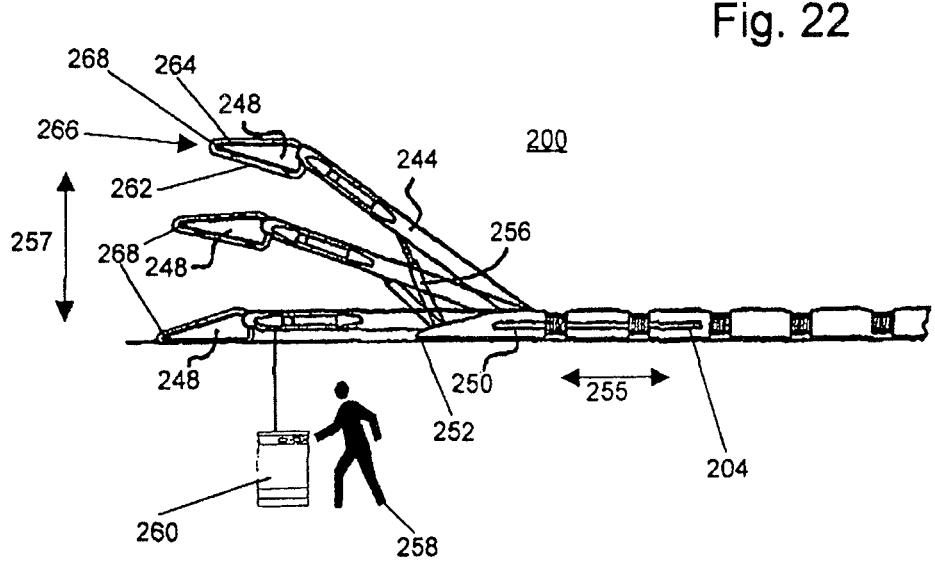
FIG. 22 shows a schematically simplified lateral view of the end located in the cargo hold of another variant of a conveyor unit including a multi-function operating element.

FIGS. 22 to 25 show further variants of a conveyor unit in accordance with the invention. FIG. 22 is a schematically simplified lateral view explaining another exemplary variant of the above discussed conveyor unit in more detail, with the latter being shown in the end of the cargo hold 200 on the inner side of the plane as if the viewer were located in the very cargo hold 200, with the external limitations thereof not being shown.

A first conveyor organ 204 reaches, where necessary, into the cargo hold 200 (not shown) as far as the rear end. To the first conveyor organ 204 a second conveyor organ 244 is linked, to which in turn a third conveyor organ 248 is linked. The tip 250 of the first conveyor organ 204 in the cargo hold 200 points in the direction of a wall (not shown) separating the cargo hold 200 from the remaining fuselage. The front end 250 of the first conveyor organ 204 rests on the cargo hold floor 252 or may be moved above it, and is capable of being horizontally shifted or pivoted transversely to the longitudinal axis of the plane, as is indicated symbolically in FIG. 24 by the arrow 254. The arrow 255 indicates the variability of the conveyor organ 204 in the longitudinal direction of the fuselage. Thus the tip 250 of the first conveyor organ 204 may be moved from the beginning of the cargo hold 200, which begins after a range associated to or following the cargo hold opening, to the end thereof.

The height of the third conveyor organ 248 relative to the floor 252 may be adjusted by modifying the inclination of the second conveyor organ 244. Modifying the inclination of the second conveyor organ 244 is performed by means of its elements 256 supporting its lifting, lowering, or pivoting movements. Such elements 256 may, for example, be powered parallelogram linkages, spring storages, electrically operated motor operators, or the like. Accordingly in FIG. 22 the height adjustment of the third conveyor organ 248 is symbolized by the arrow 257, with three positions of the third conveyor organ 248 being shown, namely, a position of the third conveyor organ 248 raised approximately close beneath a ceiling (not shown) of the cargo hold 200, a somewhat lower position, and lower position closely above the floor.

A person 258 present in the cargo hold 200 may purposely activate, modify or terminate the horizontal orientation of the third conveyor organ 248 or its height adjustment 257, the inclination of the second conveyor organ 244, positioning of the first conveyor organ 204 in the cargo hold 200 or the modification of its length 255 or its transverse modification 254, the conveying direction, the conveying velocity, or other functions by operating a multi-function operating element 260.

The person 258 may position the third conveyor organ 248 and operate the conveyor elements thereof in such a way that loose cargo may purposely be deposited on the location of deposition provided therefor, or again be taken away from there. The third conveyor organ may, for example, include for this purpose movable sliding organs, obliquely inclinable sliding surfaces, gripping organs, conveyor belts or the like, with conveyor belts being preferred.

In the variant represented here, the third conveyor organ 248 includes a conveyor belt 262. The conveyor belt 262 runs over a rigid slide panel 264 arranged underneath. The conveyor means or conveyor belt 262 is deflected at the tip 266 of the third conveyor organ 248 facing the loose cargo 6 around a deflection roller 268. The diameter of the deflection roller 268 is selected so small that the conveyor organ 248 forms, e.g., a kind of spatula or tongue optionally capable of being inserted at least for a distance between two vertically stacked cargo items or pieces of luggage, so that during unloading an item of loose cargo 6 partly positioned on the tip 266 of the third conveyor organ 248 may be licked or pulled up by the conveyor belt 262 similar to a tongue and transported off.

With the aid of the conveyor belt 262 of the third conveyor organ 248, loose cargo supplied by the conveyor organ 204 via the second conveyor organ 244 may purposely be deposited on the desired location of deposition. Conversely during unloading, loose cargo may purposely be picked up from a current location of deposition by the third conveyor organ 248 and handed over to the second conveyor organ 244, handed on by the latter to the first conveyor organ 204, and transported on to the outside.

As an alternative, or supplementarily to the conveyor belt 262, other conveyor means may also be provided such as, e.g., sliding organs, gripping organs, tilting chutes or the like acting in the conveying direction of the third conveyor organ, in order to have loose cargo deposited during loading by the third conveyor organ either powered or automatically on the desired location of deposition, or taken up from there during unloading. For the alternative or complementary use of other conveyor means, however, structural changes or adaptations at the third conveyor organ may become necessary so that the conveyor means may, e.g., push loose cargo from behind during loading without at the same time being in the way of the cargo items in the conveying direction. The necessary constructional adaptations involve corresponding expenditure, for which reason in the presently represented embodiment of the third conveyor organ a conveyor belt is the preferred conveyor means.

A risk to the health of the person 258 working in the cargo hold 200 to load and unload loose cargo accordingly is precluded, for the person 258 no longer needs to manually move the cargo items 6 by using physical strength.

Figure 23:
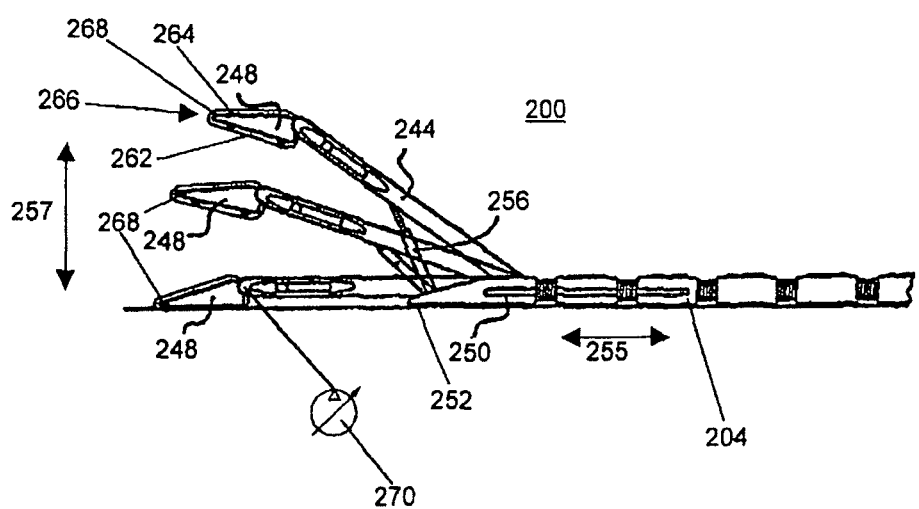
FIG. 23 shows a schematically simplified lateral view of the end located in the cargo hold of another variant of a conveyor unit including an automatic control system.
Figure 24:
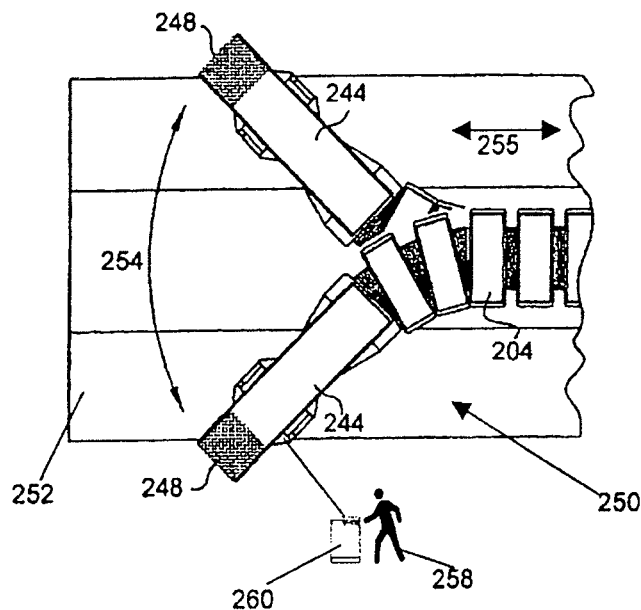
FIG. 24 shows a schematically simplified top view of the end located in the cargo hold of the variant of a conveyor unit shown in FIG. 22 including a multi-function operating element.
Figure 25:
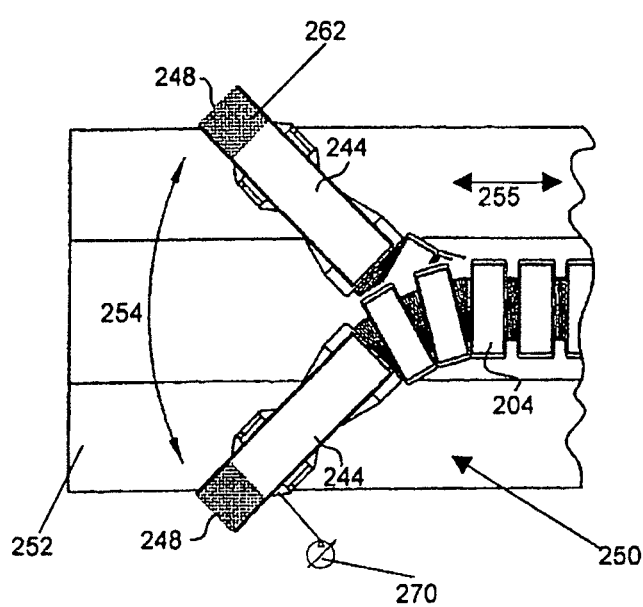
FIG. 25 shows a schematically simplified top view end located in the cargo hold of the variant shown in FIG. 23 of a conveyor unit including an automatic control system.

The variant represented in FIG. 22 and comprising a multi-function operating element 260 operated by a person 258 is shown in FIG. 23 with an automatically operating control system 270. This variant of a conveyor unit with an automatic control system 270 is represented in FIG. 25 in a schematically simplified top view.

The automatic control system 270 may, for example, include suitable sensors, cameras, control circuits, motor operators, actuators, artificial intelligence or the like, to thereby detect or determine stowing space not yet occupied in the cargo hold 200, in order to there be able to purposely and automatically deposit loose cargo 6, or during unloading to be able to purposely and automatically pick up and transport off loose cargo 6 directly from the respective location of deposition.

The present invention thus for the first time proposes a system for loading and unloading loose cargo, such as particularly pieces of luggage or the like in a cargo hold of a plane, involving conveying of the loose cargo towards the inner end of the cargo hold during loading, or away from it during unloading, and transporting of the loose cargo between the level of the tarmac and the cargo hold opening. In the system of the invention, the loose cargo may be conveyed during loading in a direction transversal to the longitudinal axis of the plane and also in the longitudinal direction of the plane into the fuselage and deposited in the cargo hold. Loose cargo conveyed back during unloading into the plane of the cargo hold opening may be conveyed off transversely to the longitudinal axis of the plane through the cargo hold opening. Moreover the invention proposes an intermediate conveyor means herefor. In particular the present invention proposes a system for loading and unloading loose cargo in a cargo hold, particularly of a plane, comprising a transport means covering, for example in a variant, the area of the floor of the cargo hold, for particularly intermittently conveying the loose cargo towards the inner end of the cargo hold during loading, or away from it during unloading, wherein the front end of the transport means reaches into the range of the cargo hold opening inside the fuselage, and comprising a conveyor organ connecting to the outside of the at the cargo hold opening for transporting the loose cargo between the level of the tarmac and the cargo hold opening. In the case of this variant of the system of the invention, for the first time at least one intermediate conveyor means is arranged between the plane-side end of the external conveyor organ and the front end of the transport means in the cargo hold, whereby during loading the loose cargo may initially be conveyed more deeply into the fuselage in a direction transversal to the longitudinal axis of the plane and subsequently be conveyed in the longitudinal direction of the plane and deposited on the front end of the transport means in the cargo hold, and whereby during unloading loose cargo conveyed via the front end of the transport means out into the plane of the cargo hold opening may be transported off transversely to the longitudinal axis of the plane through the cargo hold opening. The present invention furthermore for the first time proposes intermediate conveyor means herefor. Furthermore the present invention specifies further alternatives for the system, as well as for the intermediate conveyor means or conveyor unit, respectively.

The invention claimed is:

1. A system for loading and unloading loose cargo in a cargo hold of a plane, comprising:
transport means covering the area of the floor of the cargo hold for intermittently conveying the loose cargo towards the inner end of the cargo hold during loading, or away from it during unloading, wherein the front end of said transport means reaches into the range of the cargo hold opening inside the fuselage of the plane, and
a separate tarmac based external conveyor organ connecting to the outside of the plane at the cargo hold opening for transporting the loose cargo between the level of the tarmac and the cargo hold opening,
wherein between the plane-side end of said external conveyor organ and the front end of said transport means in the cargo hold at least one separate intermediate conveyor means is arranged, said intermediate conveyor means includes a first conveyor organ in the form of a conveyor belt, wherein, at one end thereof, said first conveyor organ is followed by a second conveyor organ in the form of a conveyor belt, for bridging the distance from one end of the external conveyor organ into the inside of the cargo hold, whereby the loose cargo is during loading initially conveyed deeper into the fuselage substantially transversely to the longitudinal axis of the plane by the first and second conveyor organs, and wherein an end of the second conveyor organ is followed by a third conveyor organ formed as a roller panel,
whereupon the loose cargo can be rotated manually in the cargo hold and transported further substantially in the longitudinal direction of the plane and deposited on the front end of said transport means in the cargo hold, and
whereby during unloading, loose cargo conveyed beyond the front end of said transport means out into the plane of the cargo hold opening may be transported off substantially transversely to the longitudinal axis of the plane through the cargo hold opening.

2. The system according to claim 1, wherein said intermediate conveyor means includes a sliding element at its lower side in the overlap range with said external conveyor organ, for slidably supporting said intermediate conveyor means on the upper side of said external conveyor organ in the end range thereof.

3. The system according to claim 2, wherein said sliding element comprises a wheel.

4. The system according to claim 1, wherein in the overlap range with said external conveyor organ an outrigger is linked to said intermediate conveyor means, which is supported by its end facing away from said intermediate conveyor means, by means of an articulation linked there, against a sliding rail oriented in parallel with the longitudinal direction of said external conveyor organ and fastened to the latter, for slidably supporting said intermediate conveyor means in the conveying direction of said external conveyor organ.

5. The system according to claim 1, wherein the end of said intermediate conveyor means facing the front end of said transport means in the cargo hold is adjustable in height relative to the beginning of said intermediate conveyor means facing said external conveyor organ.

6. The system according to claim 1, wherein an end portion of said intermediate conveyor means is capable of being pivoted about an axis transversely to the conveying direction of said intermediate conveyor means, such that this end portion may be oriented horizontally.

7. The system according to claim 1, wherein a leading portion of said intermediate conveyor means is oriented at a predetermined angle of inclination with the angle of inclination of said external conveyor organ.

8. The system according to claim 7, wherein said predetermined angle of inclination of said intermediate conveyor means with the angle of inclination of said external conveyor organ is between approximately 10° and approximately 30°.

9. The system according to claim 1, wherein said intermediate conveyor means including its conveying direction for conveying loose cargo substantially transversely to the longitudinal axis of the plane may be pivoted about an angular range of about −30° to +30° relative to the conveying direction of said external conveyor organ.

10. The system according to claim 1, wherein parts of the supporting structure of said intermediate conveyor means are manufactured of lightweight material.

11. The system according to claim 10, wherein said lightweight materials comprise aluminum.

12. The system according to claim 10, wherein said lightweight materials comprise fiber composites.

13. The system according to claim 1, wherein said intermediate conveyor means further comprises at least one frame supported against said external conveyor organ with said first conveyor organ in the form of said first conveyor belt, for receiving the loose cargo during loading in the range in front of the cargo hold opening of the plane, from the end of said external conveyor organ facing the plane, and conveying it on substantially transversely to the longitudinal axis of the plane,
wherein the second conveyor organ receives loose cargo during loading, in the range of the cargo hold opening of the plane from the end of said first conveyor organ and conveys it on substantially transversely to the longitudinal axis of the plane.

14. The system according to claim 13, wherein during unloading, loose cargo may be applied manually on said third conveyor organ from the front end of said transport means present in the cargo hold substantially in the longitudinal direction of the plane, rotatably placed there, and supported suitably for handover to said second conveyor organ, wherein said second conveyor organ conveys the loose cargo substantially transversely to the longitudinal axis of the plane to the cargo hold opening and/or through the latter and hands it over to said first conveyor organ, which conveys the loose cargo on substantially transversely to the longitudinal axis of the plane to said external conveyor organ and hands it over to the latter for further transport.

15. The system according to claim 13, wherein said frame of said first conveyor organ comprises a sliding element its lower side for a slidable support of said first conveyor organ substantially in the conveying direction of said external conveyor organ on the upper side of said external conveyor organ in the range of the end portion thereof facing the plane walls.

16. The system according to claim 15, wherein said sliding element comprises a wheel.

17. The system according to claim 13, wherein on said frame of said first conveyor organ an outrigger is linked with and is supported by its end facing away from said frame, via an articulation linked there, against a sliding rail which is oriented in parallel with the longitudinal direction of said external conveyor organ and fastened to the latter, for slidable support of said external conveyor organ of said first conveyor organ substantially in the conveying direction on said external conveyor organ.

18. The system according to claim 13, wherein said second conveyor organ is linked to said frame of said first conveyor organ such that it may be pivoted about an axis transversely to the conveying direction for modifying the height of the end of said second conveyor organ relative to its beginning.

19. The system according to claim 18, wherein said first conveyor organ may be pivoted about an angular range of between approximately −15° and approximately +45°.

20. The system according claim 13, wherein said third conveyor organ is linked to the end of said second conveyor organ such that it may be pivoted about an axis transversely to the conveying direction of said second conveyor organ, so that it may be oriented horizontally.

21. The system according to claim 13, wherein said first conveyor organ with its frame is pivotally supported on said external conveyor organ such that a degree of pivoting said intermediate conveyor means about an angular range of about −30° to +30° relative to the conveying direction of said external conveyor organ may be selected.

22. The system according to claim 13, wherein said second and/or third conveyor organ is associated with a parallelogram linkage arranged on either side of the edges of a conveyor organ, for supporting a lifting, lowering, or pivoting movement, so that such movements may be predetermined by a person working in the cargo hold approximately free of effort.

23. The system according to claim 13, wherein in the range of said third conveyor organ a multi-function operating element is provided, whereby the horizontal orientation of said third conveyor organ, the inclination of said second conveyor organ, the position of said first conveyor organ on said external conveyor organ, the conveying direction, the conveying velocity, or further functions may be controlled.

24. The system according to claim 13, wherein said third conveyor organ comprises a movable sliding organ.

25. The system according to claim 13, wherein said third conveyor organ comprises an obliquely inclinable sliding surface.

26. The system according to claim 13, wherein said third conveyor organ comprises a gripping organ for grasping loose cargo for unloading.

27. The system according to claim 13, wherein said third conveyor organ comprises a conveyor belt running over a rigid slide panel arranged underneath it, wherein said slide panel may be inserted between two cargo items jointly with the conveyor belt, and wherein the upper loose cargo may be transported off by said conveyor belt.

28. The system according to claim 13, wherein sensors, cameras, or control circuits communicating with said intermediate conveyor means are provided.

29. The system according to claim 13, wherein said outrigger includes two arms.

30. A system for loading and unloading loose cargo in a cargo hold a plane, comprising:
transport means covering the area of the floor of the cargo hold for intermittently conveying the loose cargo towards the inner end of the cargo hold during loading, or away from it during unloading, wherein the front end of said transport means reaches into the range of the cargo hold opening inside the fuselage of the plane, and
an external conveyor organ connecting to the outside of the plane at the cargo hold opening for transporting the loose cargo between the level of the tarmac and the cargo hold opening,
wherein between the plane-side end of said external conveyor organ and the front end of said transport means in the cargo hold at least one intermediate conveyor means is arranged, whereby the loose cargo may during loading initially be conveyed deeper into the fuselage substantially transversely to the longitudinal axis of the plane,
said intermediate conveyor means comprising at least one frame supported against the external conveyor organ with a first conveyor organ including a first conveyor belt for receiving the loose cargo during loading, in the range in front of the cargo hold opening of the plane, from the end of said external conveyor organ facing the plane, and conveying it on substantially transversely to the longitudinal axis of the plane, wherein the end of said first conveyor organ is followed by a second conveyor organ including a second conveyor belt for bridging the distance from the end of said external conveyor organ to the inside of the cargo hold, for receiving loose cargo during loading, in the range of the cargo hold opening of the plane, from the end of said first conveyor organ, and conveying it on substantially transversely to the longitudinal axis of the plane, wherein the end thereof is followed by a third conveyor organ including a roller panel for receiving loose cargo during loading from the end of said second conveyor organ and permitting manual rotation of the loose cargo located thereon, such that the loose cargo may be conveyed on substantially in the longitudinal direction of the plane to the front end of transport means present in the cargo hold.

31. The system according to claim 30, wherein during unloading, loose cargo may be applied manually on said third conveyor organ from the front end of said transport means present in the cargo hold substantially in the longitudinal direction of the plane, rotatably placed there, and supported suitably for handover to said second conveyor organ, wherein said second conveyor organ conveys the loose cargo substantially transversely to the longitudinal axis of the plane to the cargo hold opening and/or through the latter and hands it over to said first conveyor organ, which conveys the loose cargo on substantially transversely to the longitudinal axis of the plane to said external conveyor organ and hands it over to the latter for further transport.

32. The system according to 30, wherein said frame of said first conveyor organ comprises a sliding element at its lower side for a slidable support of said first conveyor organ substantially in the conveying direction of said external conveyor organ on the upper side of said external conveyor organ in the range of the end portion thereof facing the plane walls.

33. The system according to claim 32, wherein said sliding element comprises a wheel.

34. The system according to claim 30, wherein on said frame of said first conveyor organ an outrigger is linked with and is supported by its end facing away from said frame, via an articulation linked there, against a sliding rail which is oriented in parallel with the longitudinal direction of said external conveyor organ and fastened to the latter, for slidable support of said external conveyor organ of said first conveyor organ substantially in the conveying direction on said external conveyor organ.

35. The system according to claim 34, wherein said outrigger includes two arms.

36. The system according to claim 30, wherein said second conveyor organ is linked to said frame of said first conveyor organ such that it may be pivoted about an axis transversely to the conveying direction, for modifying the height of the end of said second conveyor organ relative to its beginning.

37. The system according to claim 36, wherein said second conveyor organ may be pivoted about an angular range of between approximately −15° and approximately +45°.

38. The system according to claim 30, wherein said third conveyor organ is linked to the end of said second conveyor organ such that it may be pivoted about an axis transversely to the conveying direction of said second conveyor organ, so that it may be oriented horizontally.

39. The system according to claim 30, wherein said first conveyor organ with its frame is pivotally supported on said external conveyor organ such that a degree of pivoting said intermediate conveyor means about an angular range of about −30° to +30° relative to the conveying direction of said external conveyor organ may be selected.

40. The system according to claim 30, wherein said second and/or third conveyor organ is associated with a parallelogram linkage arranged on either side of the edges of a conveyor organ, for supporting a lifting, lowering, or pivoting movement, so that such movements may be predetermined by a person working in the cargo hold approximately free of effort.

41. The system according to claim 30, wherein in the range of said third conveyor organ a multi-function operating element is provided, whereby the horizontal orientation of said third conveyor organ, the inclination of said second conveyor organ, the position of said first conveyor organ on said external conveyor organ, the conveying direction, the conveying velocity, or further functions may be controlled.

* * * * *